US011754506B2

(12) United States Patent
Tsai et al.

(10) Patent No.: US 11,754,506 B2
(45) Date of Patent: *Sep. 12, 2023

(54) IMAGING ASSISTED SCANNING SPECTROSCOPY FOR GEM IDENTIFICATION

(71) Applicant: Gemological Institute of America, Inc. (GIA), Carlsbad, CA (US)

(72) Inventors: Tsung-Han Tsai, Maywood, NJ (US); Hiroshi Takahashi, Fort Lee, NJ (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,784

(22) Filed: Oct. 10, 2022

(65) Prior Publication Data

US 2023/0082604 A1    Mar. 16, 2023

Related U.S. Application Data

(63) Continuation of application No. 17/200,706, filed on Mar. 12, 2021, now Pat. No. 11,499,920.

(60) Provisional application No. 63/001,064, filed on Mar. 27, 2020.

(51) Int. Cl.
| | |
|---|---|
| *G01J 3/44* | (2006.01) |
| *G01N 21/87* | (2006.01) |
| *G01N 21/65* | (2006.01) |
| *G01J 3/28* | (2006.01) |

(52) U.S. Cl.
CPC ............ *G01N 21/87* (2013.01); *G01J 3/2823* (2013.01); *G01N 21/65* (2013.01); *G01J 2003/2836* (2013.01); *G01N 2021/656* (2013.01)

(58) Field of Classification Search
CPC .. G01N 21/87; G01N 21/65; G01N 2021/656; G01J 3/2823; G01J 2003/2836; G01J 3/0267; G01J 3/027; G01J 2003/062; G01J 2003/283; G01J 3/0248; G01J 3/0264; G01J 3/0278; G01J 3/0289; G01J 3/06; G01J 3/10; G01J 3/44; G01J 3/50; G01J 3/0208; G01J 3/0218; A61B 5/0075
See application file for complete search history.

(56) References Cited

U.S. PATENT DOCUMENTS

| | | | |
|---|---|---|---|
| 6,028,666 A | 2/2000 | Boss et al. | |
| 9,040,931 B1 | 5/2015 | Tuan | |
| 10,222,337 B1 * | 3/2019 | Yoo ........................ | H01J 49/105 |
| 10,684,230 B2 | 6/2020 | Wang et al. | |
| 11,499,920 B2 | 11/2022 | Tsai et al. | |

(Continued)

FOREIGN PATENT DOCUMENTS

| | | |
|---|---|---|
| CN | 1585895 A | 2/2005 |
| CN | 105593668 A | 5/2016 |

(Continued)

*Primary Examiner* — Abdullahi Nur
(74) *Attorney, Agent, or Firm* — DLA Piper LLP (US)

(57) ABSTRACT

Systems and methods here may be used for automated capturing and analyzing spectrometer data of multiple sample gemstones on a stage, including mapping digital camera image data of samples, applying a Raman Probe to a first sample gemstone under evaluation on the stage, receiving spectrometer data of the sample gemstone from the probe, automatically moving the stage to a second sample, using the image data, and analyzing the other samples.

20 Claims, 10 Drawing Sheets

(56) References Cited

U.S. PATENT DOCUMENTS

| | | | |
|---|---|---|---|
| 2005/0190357 A1* | 9/2005 | Sasian | G01N 21/01 356/30 |
| 2006/0038980 A1 | 2/2006 | Naka et al. | |
| 2012/0276303 A1* | 11/2012 | Watanabe | C23C 18/06 427/595 |
| 2013/0321792 A1 | 12/2013 | Shapiro | |
| 2014/0113283 A1* | 4/2014 | Suh | G01N 33/587 435/7.1 |
| 2016/0178530 A1 | 6/2016 | Davies et al. | |
| 2018/0252643 A1 | 9/2018 | Brown et al. | |
| 2019/0145756 A1* | 5/2019 | Niu | G01N 21/9501 356/630 |
| 2019/0391012 A1 | 12/2019 | Kokota et al. | |

FOREIGN PATENT DOCUMENTS

| | | |
|---|---|---|
| CN | 106383105 A | 2/2017 |
| CN | 108076655 A | 5/2018 |
| CN | 108931514 A | 12/2018 |
| CN | 110214290 A | 9/2019 |
| EP | 1305608 B1 | 2/2007 |
| KR | 10-2014-0103000 A | 8/2014 |
| TW | 567310 B | 12/2003 |
| TW | 201522939 A | 6/2015 |
| TW | 201823705 A | 7/2018 |
| WO | 03/023382 A1 | 3/2003 |

\* cited by examiner

IMAGING ASSISTED SCANNING SPECTROSCOPY FOR GEM IDENTIFICATION

CROSS REFERENCE TO RELATED APPLICATION

The application is a continuation of and claims priority to U.S. application Ser. No. 17/200,706 filed Mar. 12, 2021, which in turn claims priority from U.S. Provisional Application No. 63/001,064 filed on Mar. 27, 2020, the entirety of which are hereby incorporated by reference.

FIELD

The field includes systems and methods for automated alignment of instruments used for analyzing a diamond or other gemstone, analyzing gemstones using spectroscopy, and/or analysis of digital images.

BACKGROUND

Raman/photoluminescence and absorption spectroscopies are tools used for gemstone identification and screening. For example, the systems and methods may be used for screening lab-grown diamonds and diamond simulants from natural diamonds as well as identifying the type of the mineral in a gemstone.

Unfortunately, spectroscopy measurement requires accurate sample alignment to overlap the tested sample with the focal spot of the optics. Failure to achieve the accurate alignment may result in weak signal level or even reception of signals from neighboring samples on a given piece of jewelry. And such alignment may be difficult due to use of a strong laser power and the reflected laser beam from polished gemstones. Further complicating the matter, the lasers which are strong enough to generate Raman/photoluminescence signal are far beyond exposure limits for eye safety, so the entire measurement system and the sample may be enclosed in order to meet proper human safety requirements. Traditionally, such human users rely on visually aligning the sample with a laser safety goggle and using the received signal as a reference to back and forth align the sample until maximized the signal. This limitation slows down the alignment process and eliminates automated screening efficiencies.

An alternative method is to couple the spectroscopy system into an optical microscope. Conventional microscope based Raman and absorption spectroscopies with a motorized stage can be used for sample alignment in a fully enclosed environment, however, an optical microscope has relatively small field of view. For example, a low magnification 4x objective lens may have only 2 mm horizontal field of view, which might be even smaller than the tested sample. When measuring multiple samples, such a small field of view may confine the eye sight of a user. In addition, jewelry identification does not need high spatial resolution (<10 μm) provided by the microscope. Each sample may only need one or a small amount of well-aligned measurements. Therefore, using a microscope does not provide the advantage for gemstone screening either. Nor does color get evaluated in such systems.

There is a need for an automated system that allows for efficient testing that is both accurate and able to be used in many different circumstances for multiple testing scenarios.

SUMMARY

Systems and methods here may be used to provide a method to automatically align analysis tools for one or multiple gemstones, to analyze gemstones in an easily reproducible arrangement and produces reliable results.

Systems and methods for capturing and analyzing spectrometer data on multiple sample gemstones, may include using a computer with a processor and memory, in communication with a digital camera, a Raman probe, and at least one stage motor configured to move a stage, determining if a first sample gemstone on the stage is in focus for the digital camera and the Raman probe, by analyzing a captured digital image of the first sample taken by the digital camera. In some examples, additionally or alternatively, the at least one stage motor is capable of moving the stage in an X, Y and Z direction, and rotating the stage. In some examples, the Raman probe is mounted in an angled configuration, as measured from line of sight of the camera to keep out of the field-of-view of the digital camera, if the sample is not in focus, by the computer, focusing the camera on the sample by sending instruction to the motor to move Z stage, if the sample is in focus, capturing a pixelated image of the stage using the digital camera, mapping multiple samples including the first sample in the X, Y plane using the pixel information, determining, by the computer, relationships between the captured digital image pixels and distances of multiple samples on the stage, directing movement of the stage, by the stage motors, to position a first sample under the Raman probe; and recording a spectrometer signal of the Raman probe for the first sample.

Additionally or alternatively, some examples further include determining a hue, lightness, and chroma value for the first sample using the digital image pixels of the first sample, determining a color grade from D to Z of the first sample, based on the corresponding hue, lightness, and chroma determined values. Additionally or alternatively, some examples further include determining a size value for the first sample using the digital image pixels of the first sample, by comparing pixel numbers in each sample to a calibration of distance.

Additionally or alternatively, some examples further include determining a size of the first sample by comparing pixel numbers in the first sample of the pixelated image to a calibration of distance, determining a mineral type of the first sample based on the Raman spectra of the first sample, determining a density of the first sample using the mineral type using a table of density and mineral types, determining a volume of the first sample using the determined size of the first sample; and determining a weight of the first sample by multiplying the determined density by the determined volume.

Additionally or alternatively, systems and methods here for capturing and analyzing spectrometer data on multiple sample gemstones may include, by a computer with a processor and memory, the computer in communication with a digital camera, Raman probe, and stage motor, the computer determining if a sample on the stage is in focus for the digital camera and Raman probe, if not, then calibrating, in some examples calibrating includes conducting Z dimension alignment by adjusting the Z position of the stage using returns for a highest signal return, focusing the digital camera to a plane using sharpness of a captured image, conducting a pixel-to-distance conversion between digital image pixels and actual distance using a known distance guide, and analyzing a captured image to locate a Raman probe laser spot, if calibrating is not necessary, or after calibrating, capturing a focused pixelated image of samples on the stage, locating individual samples in the X, Y plane using the pixel information, calculating the required movement of the stage to place the Raman probe laser spot on a first selected sample position using the pixel-to-distance conversion and the laser spot information, sending commands to the stage motors for moving the stage to position the first selected sample under the Raman probe and to overlap the first selected sample with the Raman probe laser spot, determining if the first selected sample is in focus by the camera for analysis by the probe based on a pixelated image of the first selected sample captured by the digital camera, if the pixelated image of the first selected sample is determined to not be in focus, sending commands to the stage motors for moving the stage Z position, determining the pixelated image of the first selected sample is in focus, and recording a Raman probe spectrometer signal by a spectrometer for the first selected sample.

In some examples, additionally or alternatively, after the spectrometer signal is recorded for the first selected sample, sending commands to the stage motors for moving the stage to position a second selected sample using the mapped coordinates and pixel-to-distance conversion. Some examples include determining if the selected second sample is in focus for the camera and probe based on a pixelated image captured by the digital camera, if the pixelated image of the second selected sample is determined to not be in focus, sending commands to the stage motor for moving the stage Z position, determining the second selected sample is in focus, and recording a Raman probe spectrometer signal by a spectrometer for the second selected sample.

Some examples include causing display of a result of the spectrometer signal of the first and second samples. And some examples include determining the pixelated image of the first selected sample is in focus, and recording a second Raman probe spectrometer signal by a second spectrometer for the first selected sample, and in some examples, additionally or alternatively, the second Raman probe is mounted in an angled configuration as measured from a line of sight of the camera to the stage, wherein the Raman probe and the second Raman probe are each configured with spectrometers of different resolution, and wherein the Raman probe and the second Raman probe are each configured with lasers of different wavelengths. Some examples include causing display of a result of the spectrometer signal of the first and second spectrometers. And in some examples, additionally or alternatively, the Raman probe is mounted in an angled configuration, out of a field-of-view of the digital camera. And in some examples, additionally or alternatively, the determining if the first selected sample is in focus by the camera for analysis by the probe includes sending instruction to the stage motor to move the stage until the Raman probe returns a highest signal return for a Z dimension. In some examples, the Raman probe is mounted in an angled configuration, out of the field-of-view of the digital camera.

Systems and methods here may be used for analyzing a gemstone, using a computer in communication with a Raman probe, a spectrometer, and at least one stage motor configured to move a stage supporting a gemstone, by causing the Raman probe to send data regarding the gemstone on the stage to the spectrometer, at a first location on a table of the gemstone, storing, by the computer, resulting spectrometer signal of the Raman probe of the first location on the table of the gemstone, causing by the computer, the at least one stage motor to move the stage in at least one of an X and Y direction and thereby reposition the Raman probe to a second location on the table of the gemstone, causing by the computer, the Raman probe to send data regarding the gemstone on the stage to the spectrometer, at the second location on a table of the gemstone, storing by the computer, resulting spectrometer signal of the Raman probe of the second location on the table of the gemstone, generating by the computer, a three-dimensional chart depicting spectrometer data covering the table of a gemstone, using at least the stored resulting spectrometer signals of the Raman probe of the first and second location of the table of the gemstone.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Figure 1:
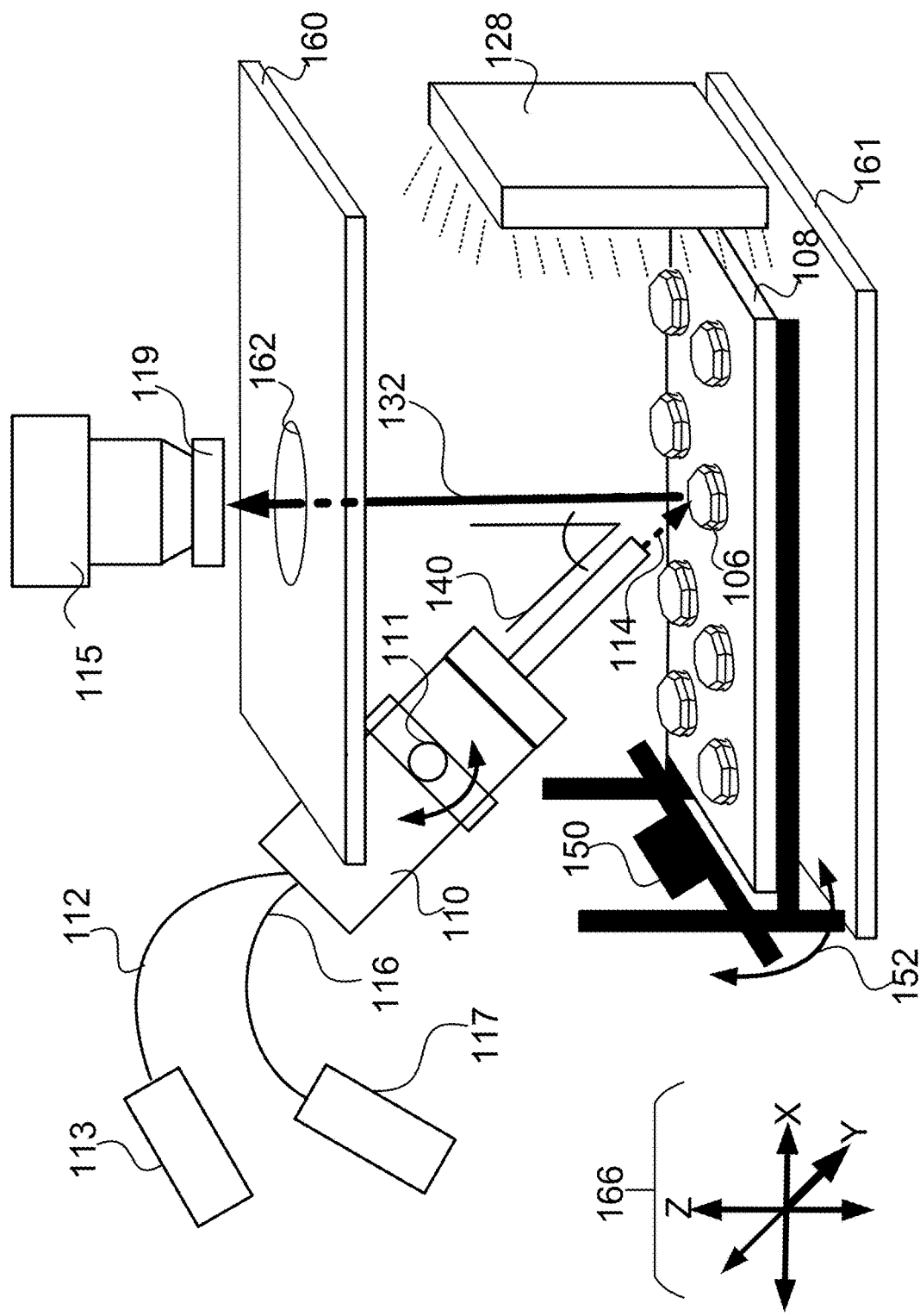
FIG. 1 is an illustration of an example analysis system in accordance with certain aspects described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

Systems and methods here may be used to pre-align one or multiple spectroscopy probes with a dual or multiple magnification imaging system on a stage arranged with automated motors. Since such alignment may be based on the imaging system as well as an image process algorithm, the entire system may be enclosed to meet any kind of human laser safety requirement and also provide a solution for automated alignment of sample gemstones for accurate and speedy analysis.

The use of Raman spectroscopy is an effective method for identification of materials such as gemstones. For example, one application may be to decipher nephrite jade, from the lesser valuable jadeite although the two might be indecipherable to the naked eye. Such analysis may also help decipher jade, both imitation jade (i.e. other minerals altogether) and processed jade, in which the minerals are heated, chemically altered, dyed or waxed. First, the stone may be analyzed by applying a laser signal to a stone using a Raman probe, and then recording the reflected signal with a spectrometer. For example, the Si—O—Si symmetric stretching feature in a spectroscopy chart may be located at slightly different places in the materials, 675 cm-1 in nephrite and above 695 cm-1 in jadeite. Based on Raman spectroscopy graph peak positions Nephrite features may include: 162*, 179, 223, 368*, 394*, 415*, 675, 930, 1031, and 1058 cm$^{-1}$ (*weak features) and Jadeite features may include: 205, 377, 436, 695, 993, and 1039 cm$^{-1}$. These are different results from Raman probe analysis using a high resolution spectroscopy <20 cm$^{-1}$ equals to 0.5 nm when using 532 nm as laser wavelength and spectral resolution: <0.3 nm. These peaks might need ~0.3 nm spectral resolution and equal to ~10 cm$^{-1}$ to resolve. And further, in some examples, a map of the stone may be useful as the two materials jadeite and nephrite could co-exist in the same gemstone.

Generally, these recorded results may be compared to known spectrometer records of various stones and variations of stones to find a match for identification purposes. Other gemstones besides jade may similarly be identified using Raman spectroscopy.

But application of such a system was limited to manual application of the Raman probe until the systems and methods described here. The systems and methods described herein may be used to analyze many multiple sizes and shapes of gemstones, including those mounted in jewelry or other mounts that might be difficult to otherwise analyze. In some examples, only portions of gemstone may be seen in a mounted piece of jewelry, and other portions obscured. The system may therefore be versatile in that it may remove the requirement of disgorging a gemstone from a mount in order to properly analyze it. This saves time, money, potential damage, and effort in analyzing many multiple gemstones in a mounted condition, without removal, and while in an ordinary state. Further, the automated movement of the samples on the stage under the probe may protect humans from laser exposures.

The system arrangement as described herein may include one or multiple long focal length spectroscopy probes to measure samples. The spectroscopy probe may be one or more Raman and/or Photoluminescence probe(s). In some examples, additionally or alternatively, multiple probes may be used at the same time. In examples with more than one probe, each may include different laser wavelengths or one may utilize an absorption spectroscopy probe.

Figure 6:
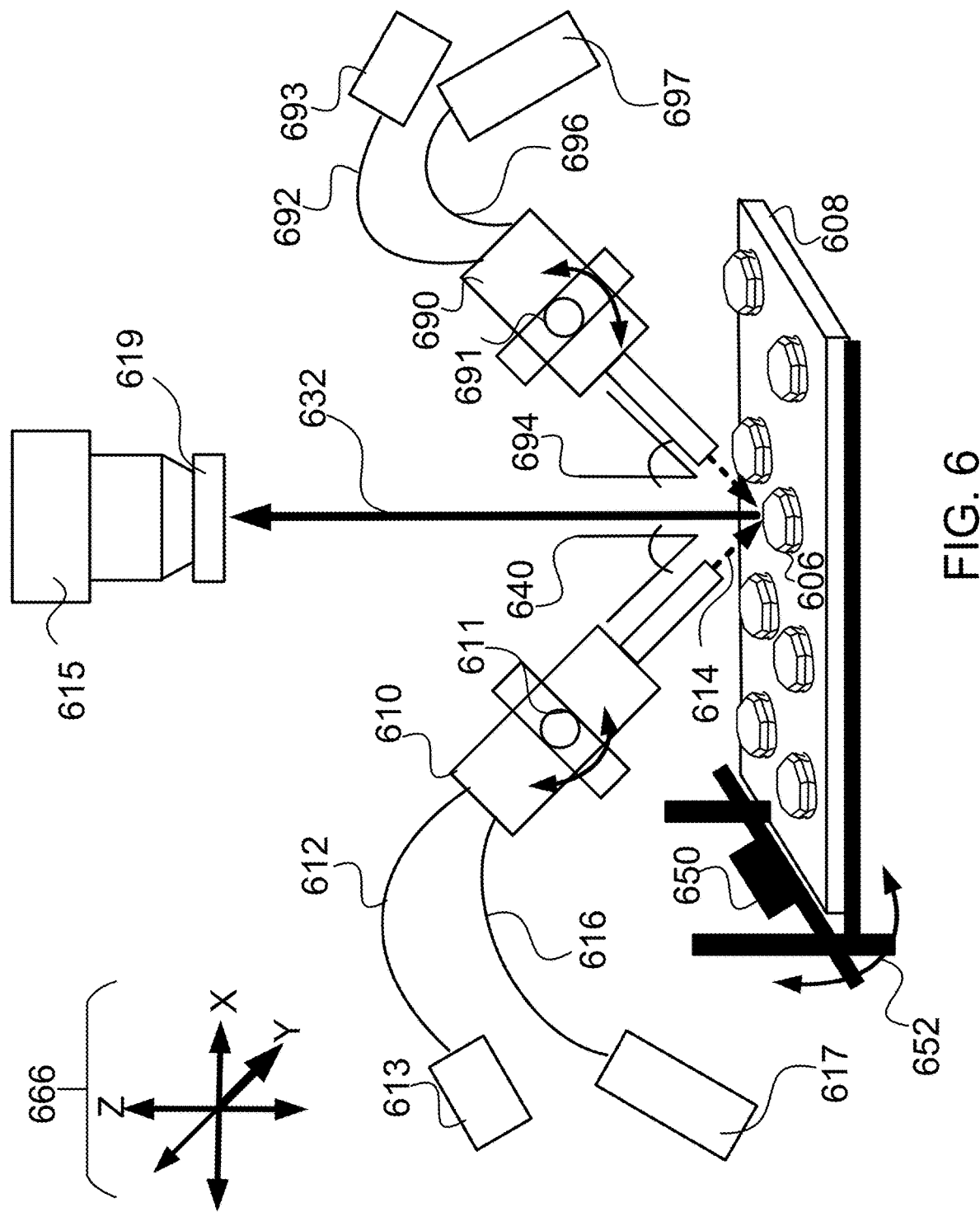
FIG. 6 is an illustration of an example analysis system in accordance with certain aspects described herein.

In some examples, additionally or alternatively, the camera may be mounted such that the field of view is down onto the stage where the samples are located, because the camera may be used to capture images used for positioning of the stage and/or Raman probe to gather data. Because the camera is positioned with a line of sight to the samples and stage, any probes may be positioned out of the way of the camera line-of-sight. In some examples, additionally or alternatively, the probe(s) may be tilted such that only a small mount, or no amount of the probe appears in the camera line of sight. In some examples, additionally or alternatively, the probe may be positioned such that its shadow may not appear in the camera line of sight. This may be arranged even though the focus point of the Raman Probe would overlap with focusing plane of the camera—in some examples by tilting the probe as shown in FIGS. 1 and 6. In such a way, the probes may be mounted at an angle as measured from a line of sight of the camera to the stage, to allow for a camera to be mounted to view the sample stage and gemstones under analysis. The camera images may be used to confirm the sample positioning on a stage, and view the samples, while the probes conduct the analysis.

Additionally or alternatively, automated movement of the sample stage, to ensure proper alignment of the probes may be configured using the systems and methods described herein.

Example Alignment and Mapping

The systems and methods here may be used to localize the position of a gemstone sample and to calculate the actual distances in horizontal and vertical directions need to be moved in order to align the sample to the spectroscopy probes for measurements. The imaging system may include one or multiple cameras which perform two main functions: to localize the sample position on the horizontal plane and confirm the vertical position of the sample is overlapped with the focal point of the spectroscopy probes.

The first function may utilize a wide angle imaging lens which has enough field of view to cover all the samples. In some examples, additionally or alternatively, the field of view can be set as 30 mm by 25 mm, which may be wide enough to cover most samples on a typical stage. One example field-of-view for screening/scanning application may at least cover around 20 mm field of view, which is <0.45× magnification when using a ⅔ inch frame size camera.

Such an example imaging system may have low or no image distortion across the entire field of view. A conversion factor may be calculated between the pixel size in the imaging system and the actual distance in the image plane using a stage micrometer. The stage micrometer may be a piece of glass with micrometer patterns, similar to a ruler, which may be used for imaging system calibration.

The second function may utilize an imaging lens with short depth of focus, which is sensitive to minor vertical movements. In such examples, a lens with high magnification plus high F-number may be suitable for this function. The imaging system may be one camera or multiple cameras with different magnifications.

The horizontal movement may be calculated by a computer system using the collected images from the wide field of view camera to align the tested sample with the spectroscopy probes. In such examples, horizontal movement parameters may be sent to the motorized translation stage to move the sample for alignment. After the initial horizontal alignment, the vertical axis movement may be calculated by the computer system using the images from the short depth of focus camera to overlap the tested sample with the focal plane of the spectroscopy probes. The vertical alignment process may be similar to the conventional auto-focus function, in which the imaging system scans across the vertical direction and capture multiple images to calculate a focused vertical position. An auto-focus algorithm may use the cut or the surface feature from the gemstone to confirm the focusing. The translation stage may then be moved for the sample to the in-focus vertical position. It is possible that after vertical positioning, another horizontal alignment or back and forth horizontal and vertical alignment may be utilized. In some examples, additionally or alternatively, one camera may be used instead of two.

Once in alignment, the spectroscopy probes may measure the tested samples by collecting Raman and/or Photoluminescence spectra using the spectrometer. The process from alignment to measurement may be repeated for each individual sample. Based on the result from the spectroscopy probes, the user or the computer algorithm analyzes the spectra to make decision for gemstone screening and identification. In some examples, additionally or alternatively, this may include chart analysis and matching with known charts for other gemstone samples.

In some examples, additionally or alternatively, multiple Raman spectroscopy probes can be integrated into one system to measure the samples under different laser excitation wavelengths and/or using different field-of-views with the same setup.

Hardware Setup Examples

FIG. 1 shows an example hardware setup of the equipment which may be utilized to employ the methods described herein. As shown in FIG. 1, the field of view 132 for the camera 115 may allow for alignment of the probe 110 on the gemstone(s) 106 arranged in/on the stage 108. In some examples, additionally or alternatively, the camera 115 may include a lens 119. In some examples, additionally or alternatively, as discussed above, the camera 115 lens 119 may be an Imaging lens for example, but not limited to a Fixed magnification imaging lens, Macro lens (for less distorsion), Telecentric lens (for long working distance), Manually or mororized adjustable magnification imaging lens (for changing field of view). The imaging lens 119 may also include manual or mororized focusing such as, but not limited to a digital single-lens reflex camera (DSLR).

The operator may simply place any number of sample gemstones 106 in holders or without holders on the stage 108 for analysis, and then move the table or stage 108 and/or the probe 110 to analyze the gemstones 106 that may be arranged on or in the stage 108. The arrangement in FIG. 1 may allow for automated alignment of many multiple samples and greatly simplifies the process for the operator, who otherwise would have to load a new gemstone 106 for analysis one at a time, and align the probe 110 manually, for each different stone sample.

In the example, many multiple component parts may be included into one overall unit. This unit may include a camera arrangement 115, a mounted Raman probe 110, and a gemstone stage 108 with accompanying motors 150 along with a cover to shield the laser light from an operator user (not pictured). In some examples, additionally or alternatively, the motors 150 may be servo and/or stepper motors, servo motors, AC servo motor, AC induction motor, Piezo motor, Voice coil motor, and/or Actuator or any other kind of electric or other motor capable of moving the stage in the X, Y, and/or Z dimensions 166 and/or rotating 152 about one or multiple axes. In some examples, additionally or alternatively, each of these component parts may be mounted to an overall system frame (not shown) by movable and/or adjustable and/or motorized mounting brackets and joints. In such a way, the X, Y, and Z 166 positions and tilt angles for each component part (camera 115, Raman Probe 110, stage 108, etc.) may be moved independently from one another and/or rotated as needed to align, focus, and/or otherwise analyze the samples 106. In some examples, additionally or alternatively, such motors may be in communication with the computing system to create a feedback loop for auto focus of the cameras, movement between samples, and automated analysis using image analysis.

Figure 9:
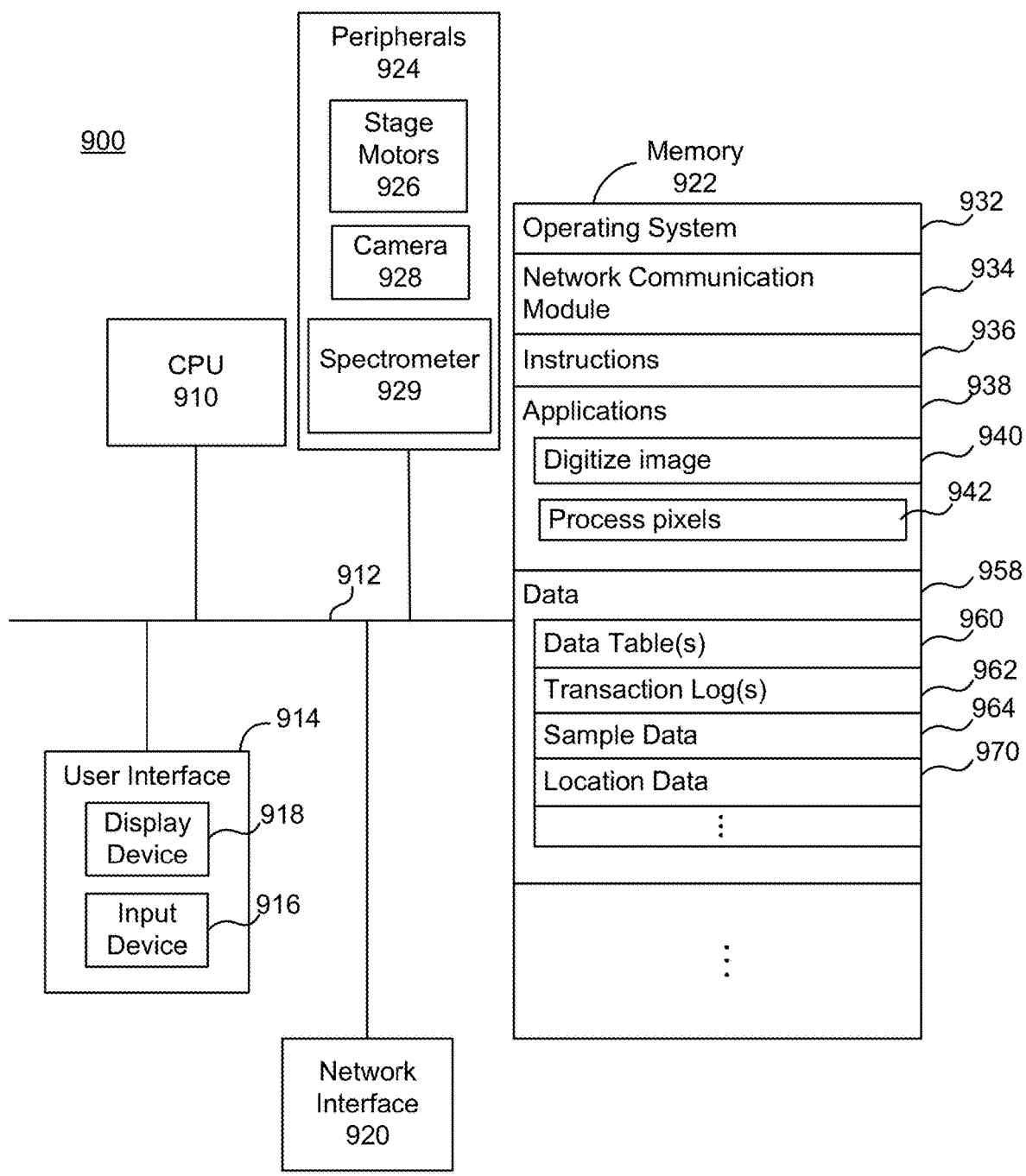
FIG. 9 is an illustration of an example computer system in accordance with certain aspects described herein.

In such examples, each of these component parts (Raman probe 110, spectrometer 117, laser 113, camera 115, table 108 motors 150,) may be in communication with a computer or computer systems such as that described in FIG. 9 (but not shown in FIG. 1). In this way, a single system may house the camera, Raman probe(s), and movable stage that may be useful in analyzing the gemstones 106 as described herein.

The camera 115 may capture image data that may be processed by a computing device also in communication with motors on the stage 108 to adjust alignment in X, Y, and/or Z positions of the sample(s) as described herein. Such image capture information may be sent to the computing system (not shown) for analysis as described herein. Further, such image data may be utilized to focus the images using Z movement of the table 108 by the motors 150, and to move to align the samples 106 with the probe 110 in X and Y directions as described.

In some examples, additionally or alternatively, the stage 108 is able to move using translation stepper motors and/or servo motors such that the probe 110 is fixed. In some examples, additionally or alternatively, the camera 115 may be focused on the stage 108 and/or samples 106 to ensure the images captured are clear. This arrangement may allow the system to be pre-aligned to a focus plane and the probe 110 may then be positioned so that everything on the stage 108 is in focus as described herein.

The sensor used to measure the gemstones 106 may be a Raman and/or photoluminescence probe 110. In the example of FIG. 1, the Raman probe 110 includes fiber lines which include both the excitation laser transmission lines 112 in communication with a laser 113 and collection lines 116 for the spectrometer 117. The probe 110 may emit laser radiation 114 used to excite a gemstone 106 as described herein. In some examples, additionally or alternatively, the light source 114 may be in the visible, near infrared, or near ultraviolet range. Each wavelength has its own uses. For example, a 405 nm Raman/Photoluminescence probe may be appropriate for diamond screening, while a 532 nm or 785 nm Raman probe may be useful for colored gemstones identification. Other commonly used wavelengths may also be included or utilized, for example, 445, 488, 514.5, 633, 639, 660, 690, 730, 808, 830, 852, 975, and/or 980 nm. In examples with multiple Raman probes, each would utilize its own laser and spectrometer.

Because of the arrangement of the camera 115, the probe 110 may get in the way of the image line of sight 132 of the camera 115. In some examples, additionally or alternatively, the probe 110 may be mounted 111 at an angle 140 at which the Raman probe 110 may still affect the sample 106 and receive a strong enough signal in response, but stay out of the way of the camera 115. In such examples, the angle 140 of the Raman probe 110 to the line of sight 132 of the camera 115 to the stage 108 and gemstone samples 106 may allow the Raman probe 110 to not be captured in any images taken by the camera 115 but still analyze the gemstones 106. In some examples, additionally or alternatively, a shadow area of the probe 110 may be reduced in such a way. Further, such arrangement may reduce the signal level only slightly from a straight down angle and still be strong enough for analysis as described.

In some examples, additionally or alternatively, such a Raman probe 110 may be set on a gimble, a hinge, a rotatable axis, rotating servo and/or stepper motor, or other movable arrangement 111 to allow for positioning and movement of such position including angle 140. In some examples, additionally or alternatively, the probe 110 may be placed/maneuvered in relation to a target gemstone 106 by a human operator. In some examples, additionally or alternatively, a motor in communication with a computing system may be mounted 111 such that a pivoting motor may adjust the angle 140 automatically, and/or in response to using a computer program, and/or remotely, in response to a human operator sending instructions, or a combination of automated and/or manual adjustments. Such an angle may be set between 15 to 30 degrees angle and in some examples, additionally or alternatively, 20 degrees down and toward the sample area, as measured from the vertical Z axis. The selected pivot angle 140 of the Raman probe 110 may depend on the viewing angle of the camera, the focal length and the dimension of the probes. The selected angle 140 of the Raman probe 110 may be adjusted as described herein.

In some examples, additionally or alternatively, the X, Y and/or Z distance of the Raman probe 110 in relation to the stage 108 and/or sample 106 may be adjusted by servo and/or stepper motors for the stage 108 and/or probe 110 mount. In some examples, additionally or alternatively, such adjustments may be made by a computer system in communication with the motors 150 as described herein. In some examples, additionally or alternatively, such motors in communication with the camera for data analysis may provide a feedback loop using image analysis and position of the probe 110, and table 108 as described in more detail in FIG. 2 and FIG. 5.

This camera 115 may then digitally capture the images of the gemstone(s) 106 for alignment as described herein. Such an image may include pixelated data representing the gemstone image as described herein. The cameras 115, may include computer components and may also be in communication with other computer components as described herein for processing the pixelated digital images, for saving, storing, sending, or otherwise aligning or manipulating the pixelated digital images of the gemstone tables.

In some examples, additionally or alternatively, the camera arrangement 115, may be adjustable to adjust focal length, it may be fixed, or removable. In some examples, additionally or alternatively, a light source such as panels fitted with and/or otherwise including Light Emitting Diodes (LEDs) 128 may surround, partially surround, approximate, or be near the stage 108 so as to aid in illuminating the gemstones 106 and aid the camera 115 with image capture for alignment.

In such examples, the lighting environment on the stage 108 may help emphasize any color differences of gemstone samples 106. Homogeneous, diffused white light may help reduce any dark areas inside the gemstones in captured images. As such, additionally or alternatively examples here include different configurations of side panels fitted with and/or including LEDs 128 and optional top 160 and/or bottom 161 reflector(s) as described herein. Such a reflector could be any number of panels made of, and/or coated with a light reflective material, such as but not limited to metals such as aluminum, steel, copper, chromium, nickel, and/or any other combination of metals. In such examples, glass mirrors may be used as reflectors. Any combination of reflective materials that are configured to reflect light, such as the light from the LED side panels 128 may be used. These illumination arrangements may allow for as precise color measurements of the samples 106 as possible.

In some examples, a diffuser may be placed in front of the LED panel(s) 128 to diffuse the light. In some examples, one, two, three, and/or four LED panels 128 may be used to illuminate the stage 108 and samples 106. Although not depicted in FIG. 1, in some examples, these LED panels 128 may surround the stage 108 on two, three, or four sides.

In some examples, the LED panel(s) 128 may be 200 mm width by 100 mm height in size. In some examples, the LED panel(s) 128 may be between 150-250 mm width by 50-150 mm height in size. Any combination of sized panels may be used.

In some examples, a reflector 160 may be positioned above, and/or below the stage 108. In examples where a reflector 160 is positioned above the stage 108, a hole 162, opening, and/or aperture may be made in the reflector in order for the camera 115 to view the stage 108 and samples 106. In such examples, the reflector(s) 160, 161 may be made of any light reflecting material and may be positioned such that the light from the LED panels(s) 128 are reflected toward the stage 108 and samples 106. In some examples, panel(s) of LEDs 128 instead of reflectors 161, 160 may be positioned above and/or below the stage 108 and samples 106. Any combination of panels of LEDs, and/or reflectors may be used to illuminate the stage 108 and samples 106. In such examples, a lighting environment with four side LED panels and both a top and bottom reflector can minimize dark area and emphasize the color differences in the samples.

In examples where the panels of LEDs 128 surround the stage 108 on four sides thereby forming a box, the Raman probe 110 may be positioned to reach into such box to analyze samples 106.

In some examples, additionally or alternatively, multiple cameras with multiple fields of view may be utilized to better align the samples 106 on the stage 108. In some examples, additionally or alternatively, multiple cameras with different fields-of-view may be used. For example, a beam splitter may be used to allow multiple cameras to share a single field of view 132 of the stage. For example, in a two camera system, a beam splitter may be designed to split a signal so each camera may view the same area. In some examples, additionally or alternatively, the beam splitter could be a 50/50 or 80/20 depending on the application and the brightness of the signal and signal wavelength.

It should be noted that the example of LED lights is merely an example and not intended to be limiting in any way. Any number of light arrangements could be used to provide illumination on the stage and samples, LEDs being just one example, alone or in combination such as halogen, fluorescent, incandescent, and/or any other kind or type.

Vertical Pre-Alignment Examples

As may be utilized for alignment of the samples in the horizontal X and Y directions, so too with vertical pre-alignment which may be calculated to obtain acceptable focus of the samples for proper alignment and also analysis measurements of samples, with the sample stage in an acceptable vertical Z dimension. To determine what is an acceptable vertical Z dimension for a sample, observations may be made, and then utilized to position the stage in the Z direction, for example, a relative distance, or Z distance between the portion of the sample which is to be analyzed and the probe and camera.

In some examples, additionally or alternatively, samples may be placed on a stage with different relative heights above that stage. In some examples, additionally or alternatively, multiple samples may be relatively the same height. This may result in different focus distances for the camera and the probe on these different samples. In some examples, additionally or alternatively, an initial calibration base position of the camera and/or Raman probe may be found for each sample. In such examples, a Z position for the stage may be found that provides a focused view of the sample, and a focused reading by the probe.

For example, the stage may move to a new sample and due to the relative height of that sample on the stage, the camera distance from the last sample may result in an out-of-focus view of the new sample. In such circumstances, the system may interpret the out-of-focus image as a trigger to reposition the stage and thereby focus the camera and allow the probe to take a proper measurement. Such a movement may be based on signal return strength as discussed in FIG. 2. In examples described herein, the stage is usually moved in order to focus the camera and/or probe for alignment and sample gathering. In some examples, additionally or alternatively, however, the cameras may be moved and/or the probe may be moved to focus the systems. Examples describing the sample stage moving are not intended to be limiting, and other movable mounts with servo and/or stepper motors may be utilized.

Figure 2:
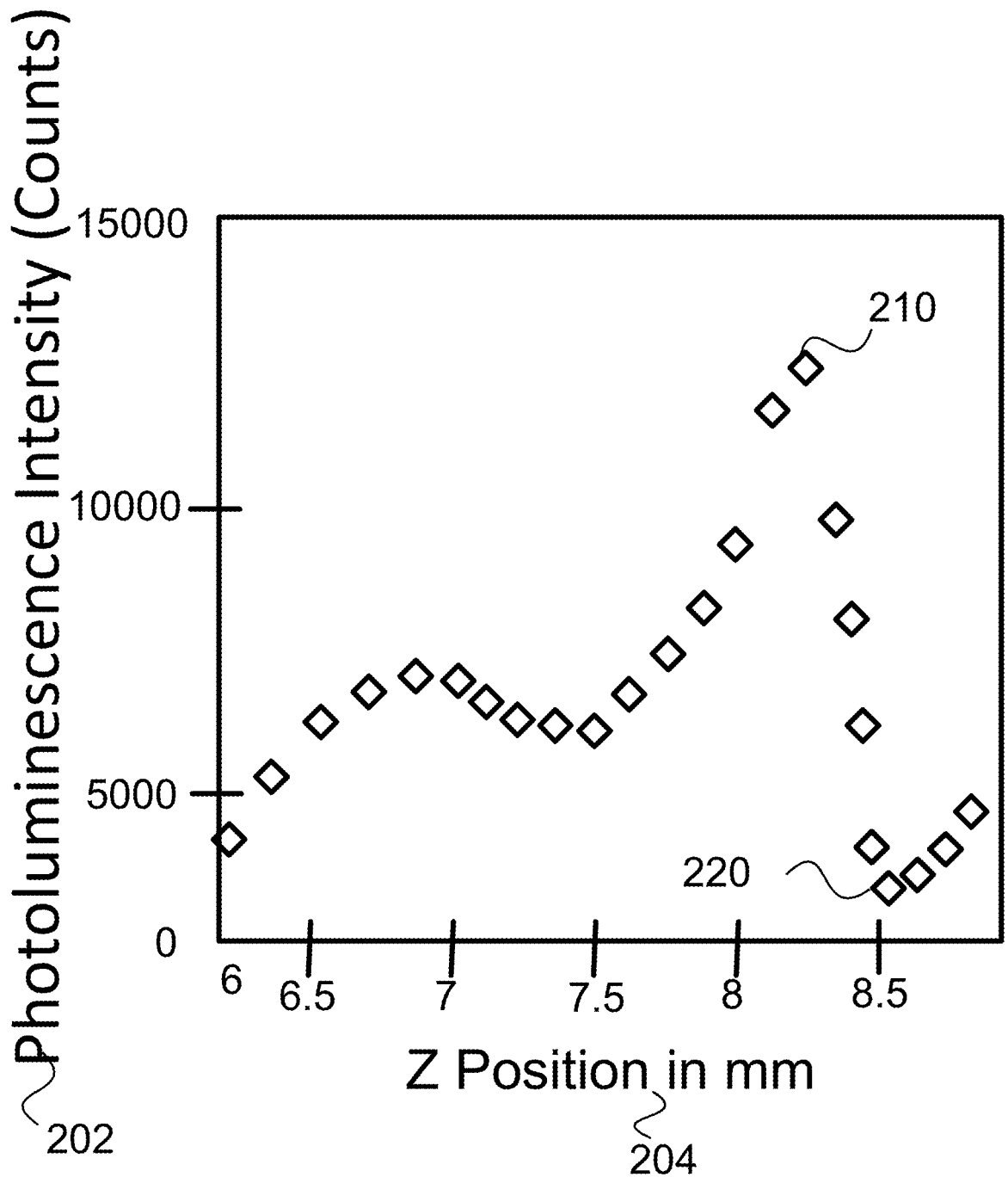
FIG. 2 is an example chart showing vertical pre-alignment examples in accordance with certain aspects described herein.

FIG. 2 shows an example of vertical pre-alignment analysis charted signal strength 202 in relation to vertical Z position 204. In some examples, additionally or alternatively, the image processing may require about 0.25 mm of accuracy to properly capture an image to be used for analysis. In some examples, additionally or alternatively, the depth of focus should be less than 0.25 mm. And because some camera imaging may have +/−1 mm depth of focus, a further magnification of Z focusing may be used.

FIG. 2 is an example chart showing vertical pre-alignment examples, that is, vertical distance between the probe and a particular sample, in accordance with certain aspects described herein. FIG. 2 shows Photoluminescence Intensity (Counts) 202 as the Y axis, where signal level used as reference to evaluate signal strength. The Z position in millimeters of the probe in relation to the table is shown on the X axis 204. As can be seen from the chart, there are Z positions for the probe that produce stronger signal strength, for example at what could be called a sweet spot 210 the highest signal strength shown over a range of Z distances. Likewise, weak signals 220 may be detected at other Z distances. Such an observation over a range of Z distances may allow for the system to calibrate a Z setting of the stage that produces the strongest signal strength to analyze.

After the Z position is finalized based on the method described in FIG. 2, the camera position may be adjusted to make the image of the sample as sharp as possible in terms of focus. Computerized image analysis may be used to make this determination of the pixelated images. This is to overlap the focus of the Raman probe an d the camera. In such examples, the focus of the camera image may be used to evaluate the quality of the focus of the Raman probe.

For example, by only changing the Z distance from the probe to the table, a chart like this may be made for a set of samples. Once the highest signal strength 210 is observed, the rest of the samples may be taken at or near that observed Z distance. Additionally or alternatively, in some examples, additionally or alternatively, a Z distance may be analyzed independently for each sample in turn.

Horizontal Pre-Alignment Examples

Figure 3:
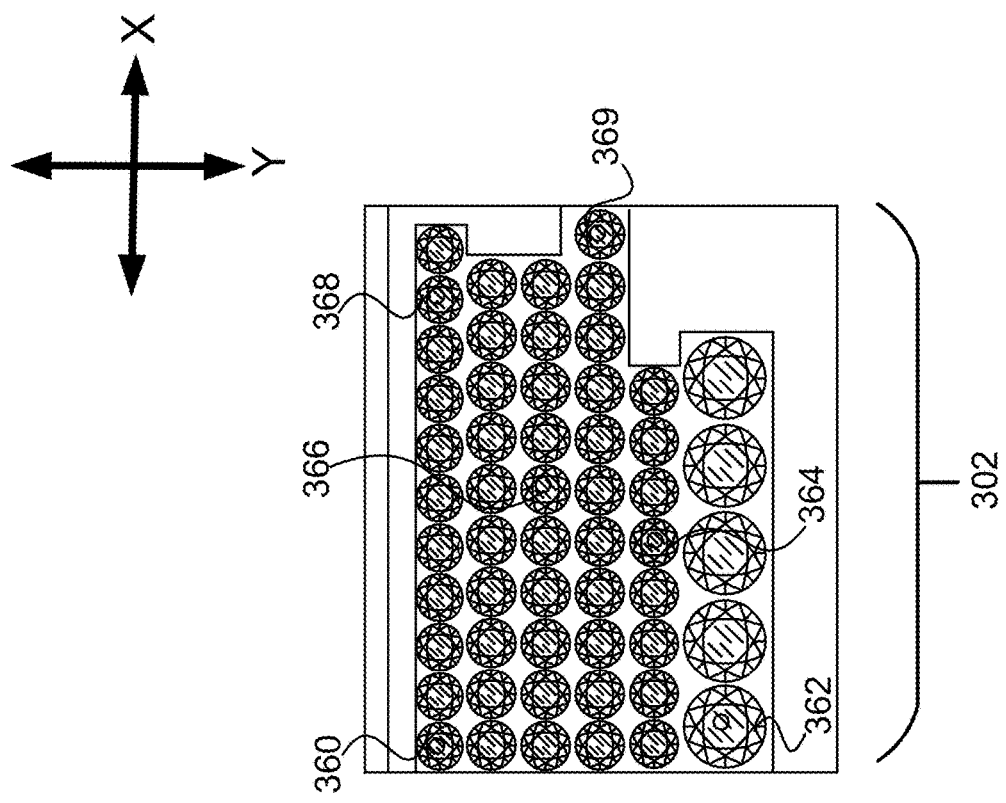
FIG. 3 is an example chart showing horizontal pre-alignment examples in accordance with certain aspects described herein.
Figure 3:
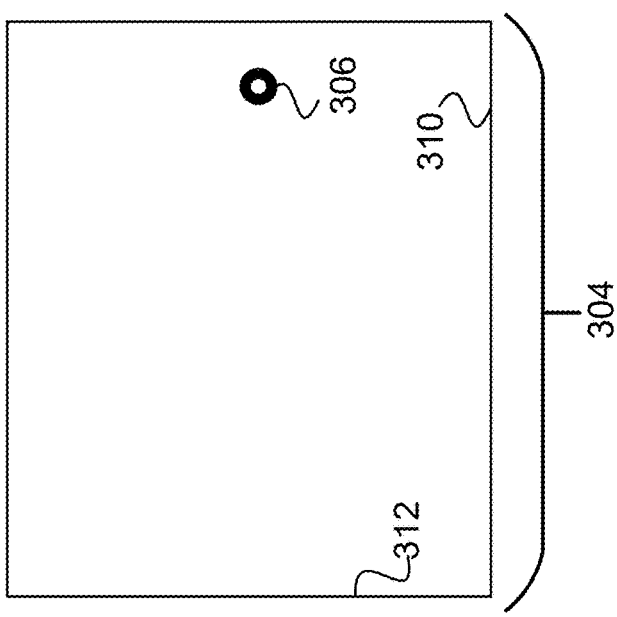

The spectroscopy probes may be pre-aligned with the imaging system to minimize time and effort during sample analysis, and allow for automated movement between samples for analysis. In arrangement such as FIG. 1, the probe 110 may be stationary, but the stage 108 may be movable by motors 150 and/or human operators. For automated stage 108 movement examples, each sample on a stage 108 may need to be positioned under the probe 110 for analysis and signal gathering, one at a time. Such movement may utilize image data captured by the camera 115 to map the samples. Further, in some examples, additionally or alternatively, information about the beam size and/or center may be used for analysis, and the servo and/or stepper motor 150 size to automate the movement of the table 108 to progress through the samples 106 and analyze each in turn. FIG. 3 is an example chart showing top-down horizontal X, Y pre-alignment examples in accordance with certain aspects described herein. Such an arrangement may allow for the system to align the Raman probe at successive samples for spectra mapping signal analysis.

In FIG. 3 a horizontal X and Y top down view of a stage of samples is shown 302. As described, a relationship between the actual samples on the stage 302 and an image 304 taken by the camera, may be used to move the stage 302 to place different samples under the beam spot 306 of the probe for analysis (110 in FIG. 1). In order to utilize such a relationship, the distances between the real world stage 302 and pixelated image data 304 may be translated by the computing system. The image 304 may be digital and made up of pixels to be correlated to be able to be used by counting them to find the actual distances and coordinates of the stage 302. Such correlation may include converting each pixel in the image 304 into a real world distance. In some examples, additionally or alternatively, each pixel in the image may be 9.2 µm. In some examples, additionally or alternatively, each pixel may be between 9 and 10 µm. In such a way, the coordinates of the stage 302 and image 304 may be mapped to one another. Other factors of conversion may include the magnification of the camera lens. In some examples, additionally or alternatively, as described above, a stage micrometer may be a piece of glass with micrometer patterns, and/or a ruler may be placed on the stage, indicating known lengths, and an image taken of the stage with the ruler for the computer system to analyze the image to count number of pixels in that particular arrangement that make up the ruler length. For example, in some examples, additionally or alternatively, a 1 mm ruler in the real world X.Y on the stage may translate to 110 pixels in length on the image captured by the camera. By counting the pixels that span the designated, known length, a conversion factor may be determined and used as described herein.

After the image pixel relationship is determined, the samples within the camera field of view on the stage 302 may be mapped by the computing system. But to perform an automated focus and/or sample progression, the system may also utilize the relationship between the movement of the stage 302 by servo and/or stepper motors (150 in FIG. 1) and a beam spot 306 size generated and used by the probe 110 in FIG. 1 used for analysis. In some examples, additionally or alternatively, the laser spot 306 may be fixed, and the stage moved to position the various samples under the laser for analysis. And if the conversion determination is used to know if the stage moves a certain number of pixels, that translates to some real world length on the stage. This too may allow for the system to move between samples to generate analysis of each sample in an automated way. In some examples, additionally or alternatively, an image may be mapped such that the system may be used to pre-select positions of the samples for analysis before analysis begins, and then an automated program may be used to move the stage as determined, using the pixels and determined conversion.

An example laser beam 306 spot size may be between 50 to 100 µm. In some examples, additionally or alternatively, the spot size may depend on the fiber core diameter (112 in FIG. 1) as well as the focal length of the optics in the probes (110 in FIG. 1). In some examples, additionally or alternatively, beam spots may be between 0.1 mm to 0.2 mm in diameter. In some examples, additionally or alternatively, the beam spot may be between 0.05 mm and 2.5 mm in diameter. In some examples, additionally or alternatively, the servo and/or stepper motors on the stage 302 step resolution may be below 10 µm. In such examples, the spot size may dominate the resolution analysis because many motor steps may be made within the same distance of one beam spot 306 size.

The system may use the mapped, pixelated image data of the stage 302 and the size and/or center of the determined beam spot 306 as well as the servo and/or stepper motor incremental step sizes, to then move the stage such that each sample on the stage 302 is analyzed in turn.

Analysis Examples

Figure 4:
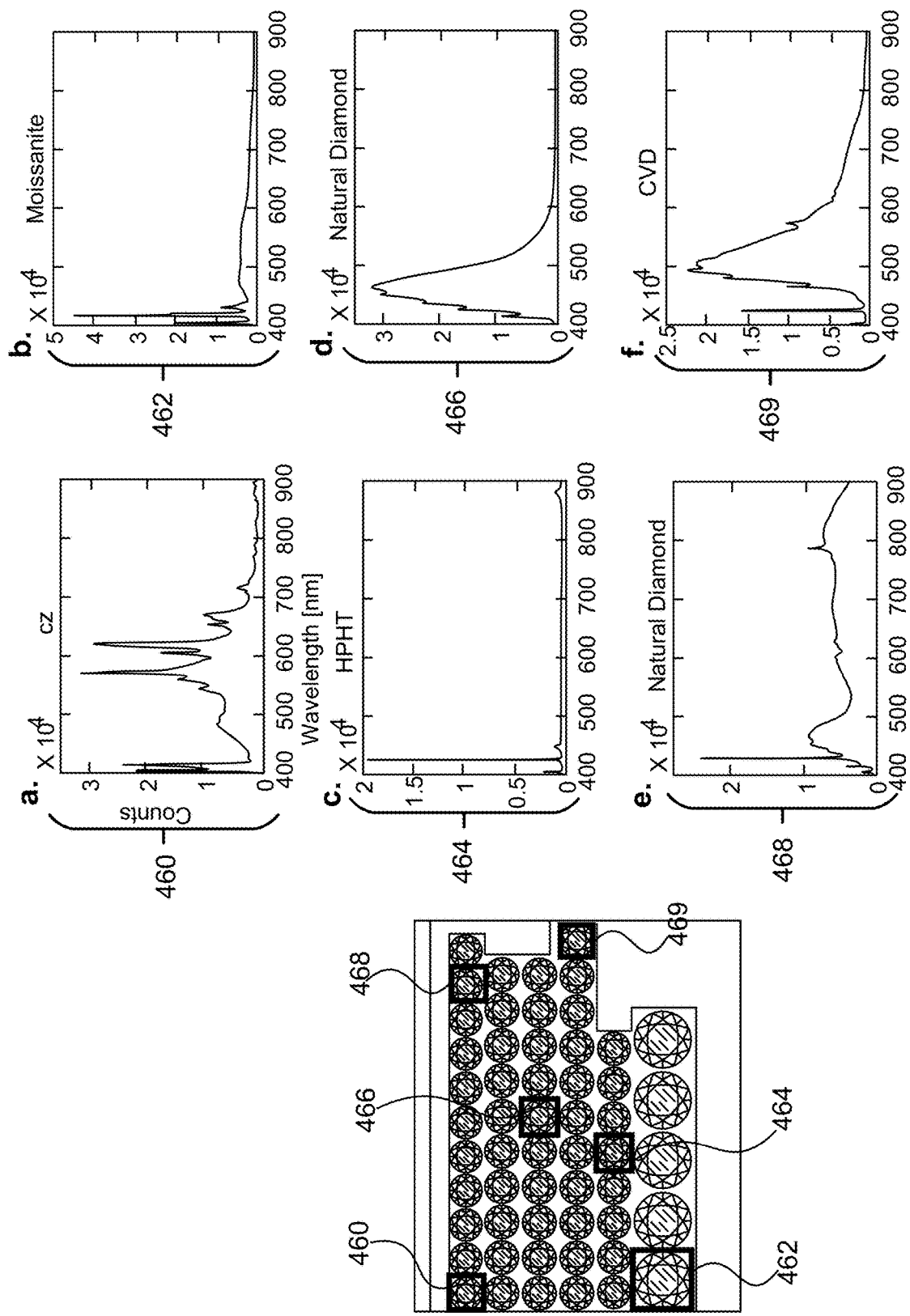
FIG. 4 shows example wavelength and count charts in accordance with certain aspects described herein.

The sample stage 302 labels six different examples for which Raman probe analysis are shown in FIG. 4. One example method may use the setup described here to screen target gemstones such as diamonds to determine whether the diamond is synthetic. Such analysis may be used to detect diamond overgrowth on a natural diamond and detecting the absence of such overgrowth on a synthetic diamond. In such examples, the fluorescence spectrum or fluorescence image may be used to detect overgrowth. Such analysis may also include comparison analysis between saved images and captured images and/or to compare saved spectrum to captured spectrum as well.

The six samples include 360, 362, 364, 366, 368 and 369 which can be measured by both their [pixel coordinates] in an image and (X-Y) stage position coordinates in the actual device, for example:

360, a. sample pixel coordinates [147,326] X-Y (20.37,6.10)
362, b. sample pixel coordinates [170,1566] X-Y (20.16, 17.51)
364, c. sample pixel coordinates [1083,1242] X-Y (11.76, 14.53)
366, d. sample pixel coordinates [1219,794] X-Y (10.51, 10.41)
368 e. sample pixel coordinates [2046,337] X-Y (2.90,6.20)
369 f. sample pixel coordinates [2320,1017] X-Y (0.38, 12.46)

FIG. 4 shows the spectrometer graphs charting Photoluminescence Intensity (Counts×10$^4$) against Wavelength absorption in nanometers (nm) for the six different samples from the table of samples in FIG. 3. In such a way, the various samples are analyzed, and correlated to their position on the sample stage such that they may be saved in the system and identified such that their respective analyses results may be stored, sent, saved, compared, mapped, and/or otherwise utilized (using computers such as those in FIG. 8 and/or 9) for the respective sample (the six of FIG. 4 are merely illustrative and in no way limiting, in many examples, each sample is analyzed). The example plots Wavelength absorption from 400 to 900 nm and counts from approximately 0 to 5×10$^4$ depending on the chart. The spectrometer results for the six example are:

460 a. sample is Cubic Zirconium
462 b. sample is Moissanite
464 c. sample is high pressure and high temperature (HPHT) lab grown diamond
466 d. sample is Natural Diamond
468 e. sample is Natural Diamond
469 f. sample is chemical vapor deposition laboratory grown diamond.

As can be seen, the charts depict different patterns of Photoluminescence Intensity (Counts×10$^4$) against Wavelength absorption in nanometers (nm) that may be used to identify a stone that is unknown and under analysis. Known charts may be used to compare to a new sample analysis chart for a matching comparison and identification.

Color Analysis Examples

In some examples, a color grade and/or determination may be made by analysis of images captured of the sample gemstones. By analyzing the pixels of the samples, the systems here may be programmed to determine any combination of various characteristics such as, but not limited to conventional color space which includes three attributes: Lightness, Chroma, and Hue. This may be accomplished by the system's analysis of properly lit samples, and conversion of the red, green, and blue pixel assignments of the captured images of the samples.

For example, referring to FIG. 3, if three different samples 360, 366, 368, may be analyzed by the system, and images captured of each. Since the images are pixelated digital images, the red, green, and blue colors captured in the images may be analyzed to determine attributes such as but not limited to chroma, lightness, and hue. For example, hue may be considered the attribute of color perception by means of which a color is judged to be red, orange, yellow, green, blue, purple, or intermediate between adjacent pairs of these, considered in a close ring. Lightness, also referred to as tone may be the attribute by which a perceived color is judged to be equivalent to one of a series of grays ranging from black to white. Chroma, also known as saturation, may be the attribute of color used to indicate the degree of departure of the color from a gray of the same lightness.

The color grading scale is from D to Z is shown in Table 1:

TABLE 1

| D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|
| Colorless | | | Near Colorless | | | | Faint | | | | Very Light | | | | Light | | | | | | | |

From these determined values of chroma, lightness, and hue, color estimates and/or grades may be assigned as shown in the example of Table 2 below:

TABLE 2

| Sample | Lightness | Chroma | Hue | Color grade |
|--------|-----------|--------|-------|-------------|
| 360 | 45.30 | 8.12 | 80.50 | O/P (brown) |
| 366 | 62.89 | 8.04 | 94.91 | O/P |
| 368 | 73.83 | 0.75 | 18.78 | E |

In such examples, pixels within the image may be subject to quantitative analysis. For example, each pixel can be analyzed to quantify the values of all color components in the particular pixel. The number of color component may be determined by an algorithm according to which the pixel is encoded when the color image is first captured. In some embodiments, the image is converted from its capturing color mode (e.g., CMYK) to a different color mode (e.g., RGB). After values are quantified for each color component in each pixel, an average value can be calculated for each color component in a given image. The process can be repeated for all images to calculate average value of each color component in all images. Eventually, a final average value can be calculated for each color component based on information from all images.

Using that information, the conversion process may be carried out for all pixels within a defined area in an image in order to calculate average values of the one or more parameters. The steps can be repeated for all images in the plurality of color images. Eventually, average values of the one or more parameters (e.g., L*, a*, and b*) can be calculated for each color component based on information from all images.

Next, a first score may be calculated based on the values of the one or more parameters. For example, here the first score can be chroma (C*) and hue (h) values, calculated based on CIE color space values (e.g., L*, a*, and b*); e.g., based on the following equations (FIG. 10):

$$C* = \sqrt{(a*)^2 + (b*)^2}$$

$$h = \tan^{-1}\left(\frac{b*}{a*}\right)$$

In some embodiments, color images may be analyzed using the standards (e.g., tables of color matching functions and illuminants as a function of wavelength) published by CIE. A plot of the standard daylight illuminant with a correlated color temperature of 6500 K, $D_{65}$. This illuminant may be represented here by the function $H_{D65}(\lambda)$. The color matching functions: $\bar{x}(\lambda)$, $\bar{y}(\lambda)$, $\bar{z}(\lambda)$ are used to calculate colorimetry parameters.

In some embodiments, the color grade represents the color or hue characteristics of the body color of the sample gemstone.

Next, individual color components in each pixel within the physical area of the gemstone in an image (e.g., defined by the corresponding outline mask) are quantified. In some embodiments, each pixel is broken into three values representing the colors red (R), green (G) and blue (B). In some embodiments, each pixel is broken into three values representing the colors cyan (C), magenta (M), yellow (Y) and black (K). In some embodiments, the image is converted from its capturing color mode (e.g., CMYK) to a different color mode (e.g., RGB), or vice versa. The individual color components are then used to compute one or more parameters, for example, CIE color space values (e.g., L*, a*, and b*).

Next, the one or more parameters (e.g., L*, a*, and b*) are computed for all images collected for a particular gemstone during one session (e.g., under the same illumination conditions) while the image capture component (e.g., a camera) is configured under the same setting.

An example of computing color characteristics (e.g., L*, a* and b*) is as follows. As diamond is a transparent material, the sum of transmission spectrum $T(\lambda)$ and reflection spectrum $R(\lambda)$ is used in the calculation of the tristimulus values, X, Y and Z:

$$X = \Sigma_{\lambda=380}^{780} H_{D65}(\lambda)(T(\lambda)+R(\lambda))\bar{x}(\lambda)$$

$$Y = \Sigma_{\lambda=380}^{780} H_{D65}(\lambda)(T(\lambda)+R(\lambda))\bar{y}(\lambda)$$

$$Z = \Sigma_{\lambda=380}^{790} H_{D65}(\lambda)(T(\lambda)+R(\lambda))\bar{z}(\lambda)$$

The chromaticity coordinates, x and y, are then defined as:

$$x = \frac{X}{X+Y+Z}$$

$$y = \frac{Y}{X+Y+Z}$$

An attempt to achieve a "perceptually uniform" colour space is the CIE 1976 colour space, otherwise known as the CIELAB colour space. Its parameters are calculated from the tristimulus values as follows:

$$\text{lightness, } L^* = 116(Y/Y_W)^{\frac{1}{3}} - 16$$

$$\text{red-green parameter, } a^* = 500\left[(X/X_W)^{\frac{1}{3}} - (Y/Y_W)^{\frac{1}{3}}\right]$$

$$\text{and yellow-blue parameter, } b^* = 200\left[(Y/Y_W)^{\frac{1}{3}} - (Z/Z_W)^{\frac{1}{3}}\right],$$

where $X_W$, $Y_W$ and $Z_W$ are the tristimulus values for the white point corresponding to the chosen illuminant, in this case D65.

$$X_w = \sum_{\lambda=380}^{780} H_{D65}(\lambda)\bar{x}(\lambda)$$

$$Y_w = \sum_{\lambda=380}^{780} H_{D65}(\lambda)\bar{y}(\lambda)$$

$$Z_w = \sum_{\lambda=380}^{780} H_{D65}(\lambda)\bar{z}(\lambda)$$

$$C_{ab}^* = \left(a^{*2} + b^{*2}\right)^{\frac{1}{3}}$$

The saturation or chroma is expressed as: and the hue angle is expressed as:

$$h_{ab} = \tan^{-1}(b^*/a^*).$$

Size/Weight Analysis Examples

In some examples, a size, and/or weight determination may be made by analysis of images captured of the samples. By analyzing the pixels of the samples in the capture images, the systems here may be programmed to determine any combination of various characteristics such as but not limited to size of the sample gemstone(s) and weight of the sample gemstone(s).

In such examples, once a digital, pixelated image is captured by the system, an analysis of the image and pixels in the image may be analyzed, counted, and compared to known values in order to determine features such as size and/or weight. By using an edge detection software, the captured pixelated images may be analyzed to find the edges of each sample gemstone.

For example, in one image, once the edges of a sample gemstone are identified, the system may count across the diameter of the gemstone table. Such an image may be calibrated to known distances such that the images may be compared to known size values. By counting the pixels, and dividing by the known calibrated numbers, a size may be determined, for example, 129 pixels=1 mm. Such a calibration is not limited by this particular example and could be set to any pixel to distance ratio depending on the camera arrangement and image analysis.

Additionally or alternatively, systems and methods here may be used for calculating weight of a sample gemstone. In such examples, other parameters may be used, in addition to the pixel counts used to determine size. For example, spectra analysis may be used to determine the mineral type in the gemstone, as described. With an assigned mineral type, the system may determine a density for the sample gemstone. In such examples, a table may be used to determine a density for each mineral type. Once determined both the size and density of the sample gemstone, the system may determine a weight of the sample using a formula.

Such a determination may be made by using the measured diameter or width and length to estimate the volume, and the equation:

Weight=volume*density

In such examples, reference can be used, for example, a round shape 1 ct. diamond is approximately 6.5 mm in diameter.

In one example, a 5 mm diameter diamond is approximately 0.46 ct. since (5/6.5)^3=0.455

For example, Table 3 below shows an example estimated weight for five different example gemstones:

TABLE 3

| 1 | 3.11 | 0.100 | (SiC) |
|---|------|-------|-----------|
| 2 | 1.39 | 0.010 | (Diamond) |
| 3 | 1.95 | 0.027 | (Diamond) |
| 4 | 1.73 | 0.019 | (Diamond) |
| 5 | 1.96 | 0.045 | (CZ) |

Stage Examples

Turning back to FIG. 1, in some examples, additionally or alternatively, the table or stage 108 upon which the sample gemstones are placed may be configured with or in conjunction with motors 150 that are capable of moving the stage 108 as described herein. In such examples, the stage 108 may be able to maneuver in three directions or dimensions, X, Y, and Z 166 and/or rotating 152 about one or multiple axes. By moving the stage 108 in the X, and Y directions, the user and/or computer may be able to maneuver different sample gemstones 106 into the field of view of the camera 115 for alignment, and angled probe 110 for analysis. This may allow for a large tray, platform, sample stage, or other gemstone holding device to be analyzed at one time, by only moving the stage 108 instead of swapping out samples one at a time. In this way, the number of sample gemstones 106 that may be analyzed in one session may increase and the amount of time to reload new samples is decreased thereby making the process of analyzing many multiple gemstones 106 more efficient.

By moving the stage 108 in the Z direction, the system may be able to focus the camera 115 on the sample gemstone 106 currently in the field of view. This Z direction focus may be useful if the size and shape of the sample gemstones 106 are each different.

In some examples, additionally or alternatively, the motors 150 that affect the movement of the stage 108 may be manually operated by a user with switches and buttons. In such a way, a user may be able to load a stage 108 with samples 106 and begin analyzing them by moving the table in the X and Y directions.

Figure 8:
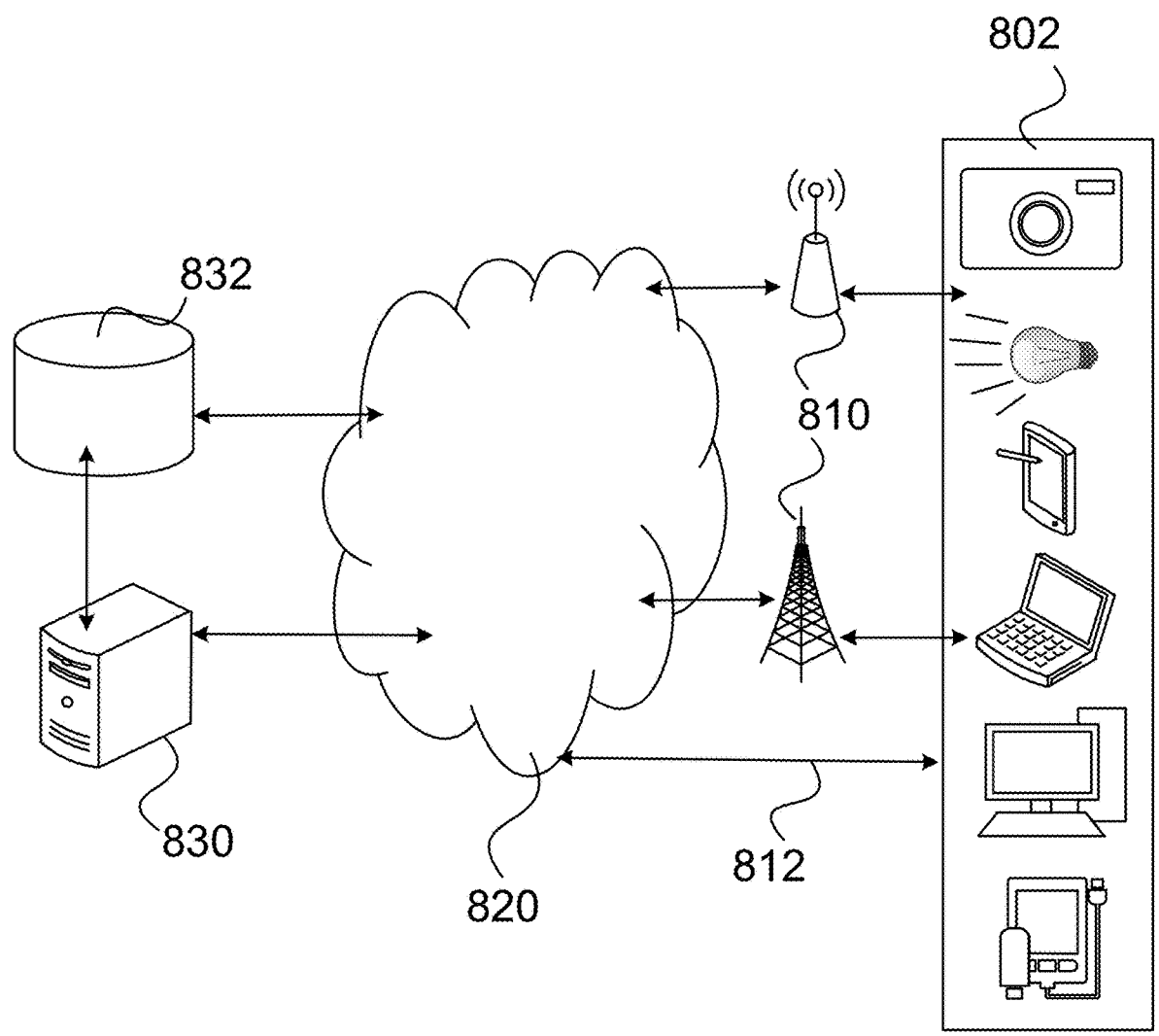
FIG. 8 is an illustration of an example networked system in accordance with certain aspects described herein.

In some examples, additionally or alternatively, the motors that affect the movement of the stage 108 may be in communication with a computer system (not shown) such as described in FIG. 9 and/or FIG. 8. In such examples, the computer may be programmed with the coordinates of the various sample gemstones 106 on the stage 108 and be able to maneuver the motors to move the stage 108 in coordination with the camera 115 and the Raman probe 110. In this way, the stage may be able to move quickly after the Raman probe 110 and the camera 115 effectuate the laser needed to test each sample gemstone 106 and then move to the next sample on the table 108.

In some examples, additionally or alternatively, the camera setup 115 may include computerized analysis of the pixelated images and include communication with the motors of the table 108. In such examples, a feedback loop may be created between the table 108 movement in the X, Y, and/or Z 166 directions, and data generated by the camera 115. In such examples, the table 108 may be maneuvered by the computers based on the analysis of the images created of the gemstones 106 and instructions programmed into the computer to focus images by moving the table in the Z direction for focused image capture. In some examples, additionally or alternatively, artificial intelligence or machine learning may be used to help focus the samples in the Z direction. In such examples, many multiple examples may be fed to the system, to train the algorithms so that the algorithms used to determine if a sample is focused or not may learn from the examples and over time make corrections to focus in the Z direction to obtain better focused results. In some examples, additionally or alternatively, artificial intelligence and/or machine learning may be used to help localizing samples in XY positions. For example, to locate each of multiple samples from the pixelated image and calculate the corresponding stage movement to move sample under the laser spot for analysis. Data may be fed into the algorithms to locate the samples in the images for training the system to do so automatically.

This computerized control of the stage 108 and camera system 115 may improve efficiency, speed up analysis, and accurately analyze multiple samples 106 in one session.

Process Step Examples

Figure 5A:
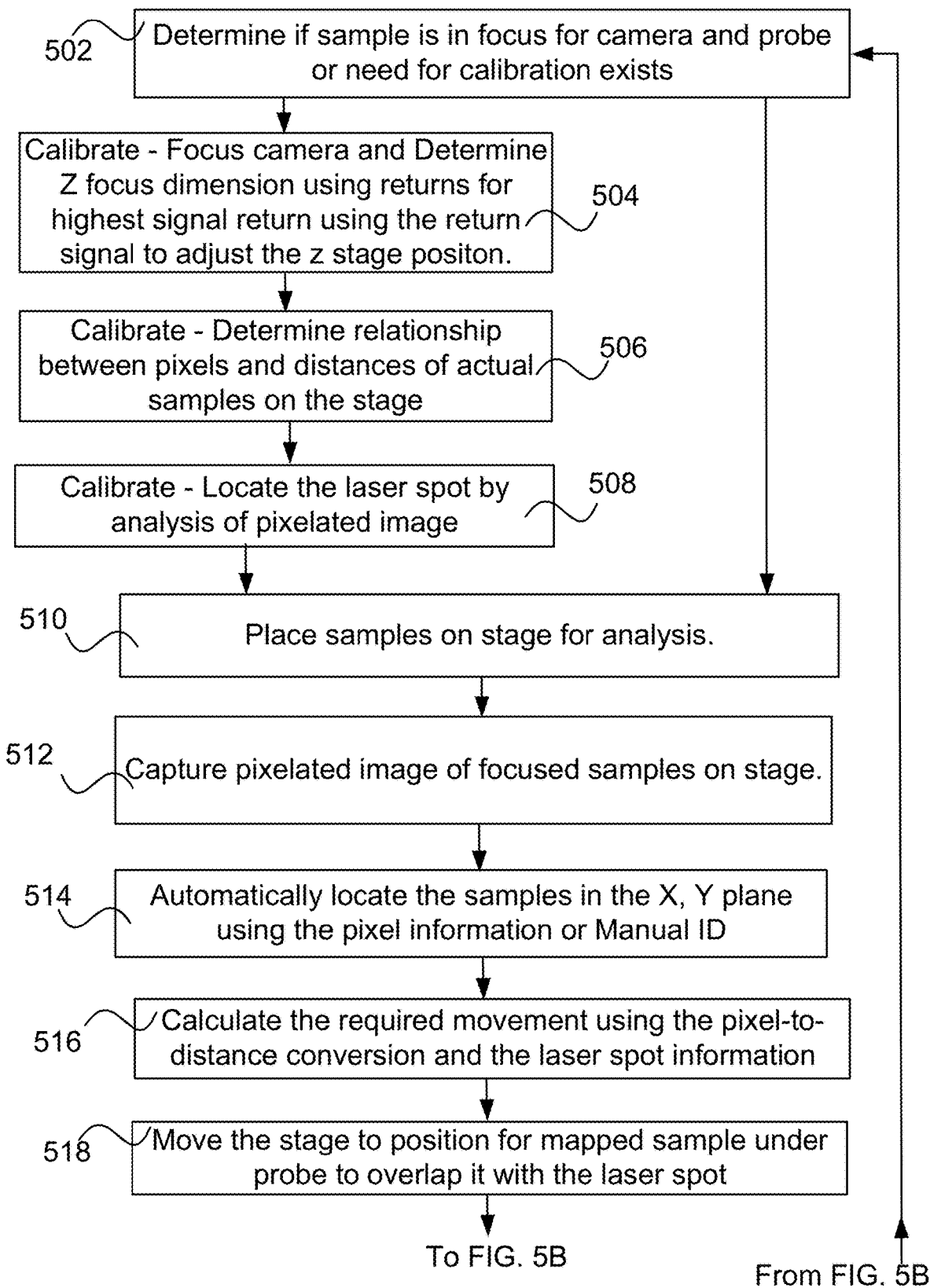
FIGS. 5A and 5B are an example flow chart showing samples of the method steps that may be employed using the systems described herein.
Figure 5B:
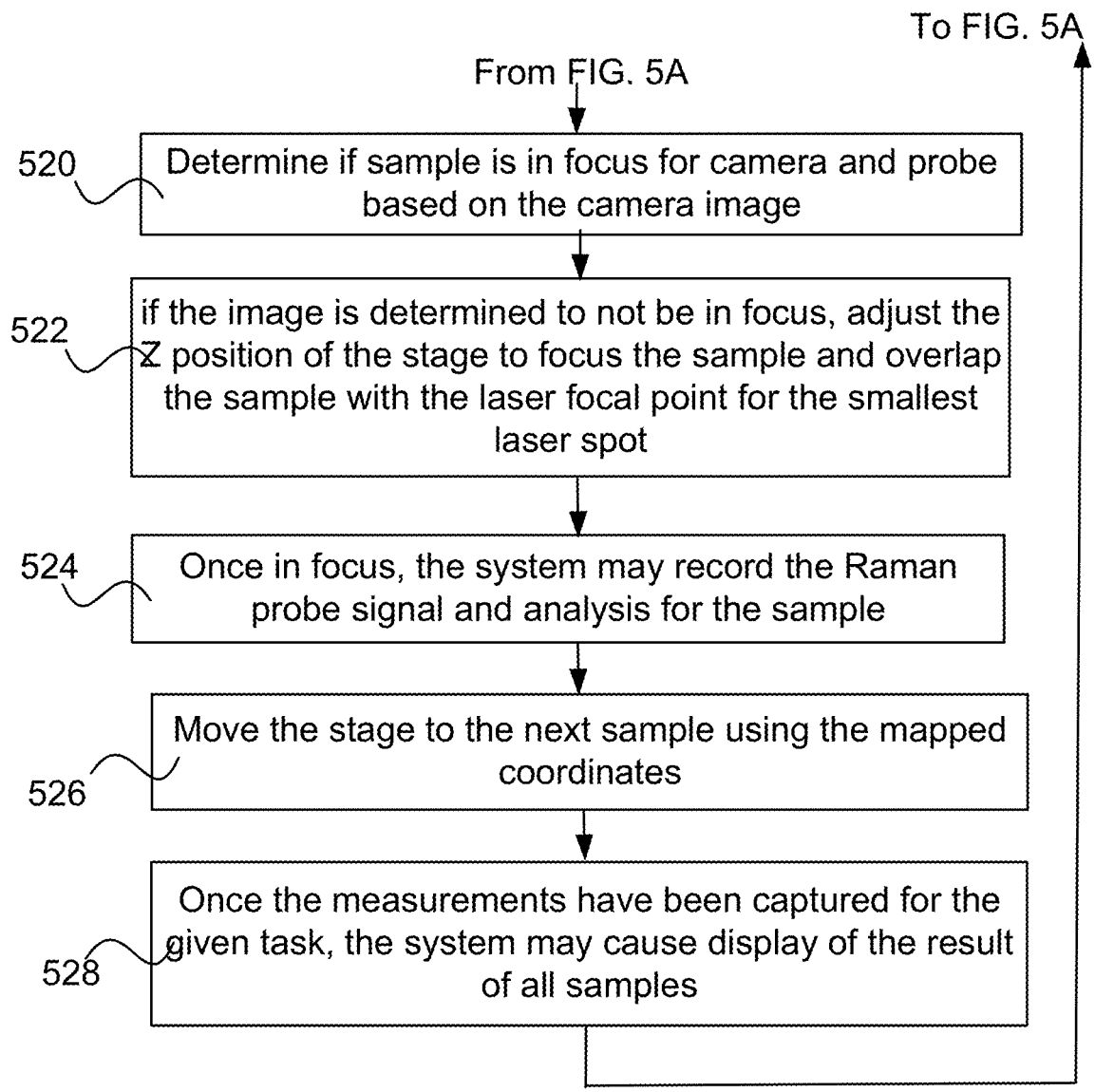

FIGS. 5A and 5B depict an example flow chart of example steps that may be used for image assisted analysis using the systems and methods described herein. In the process, the first step is for the system to determine if a sample is in focus for the camera and probe, if not, then the system may need to calibrate 502. If calibration is unnecessary, the system may skip calibration steps and proceed with analysis of the sample step 510.

But if the system is to calibrate, the system would conduct Z dimension alignment by adjusting the Z position of the stage using returns for a highest signal return (See FIG. 2) and adjusting the camera to focus on the same plane using the determined sharpness of the image 504. In some examples, additionally or alternatively, sharpness of an image may be determined using an autofocus feedback loop between the camera image and computer analysis of the image to find clear image lines, boundary lines, etc.

Next to calibrate, the system may conduct a pixel-to-distance conversion by using an object with known size to calculate the conversion factor between pixel to actual distance 506. In such examples, a ruler or grid with known distance may be placed before the camera on the stage so the camera may capture an image of the ruler or grid and then the system may count the number of pixels that fall between the known distance. In such a way, the system may then retain the number of pixels per distance in order to instruct the stage motors to move the samples.

Next to calibrate, the system may analyze a camera image to locate the laser spot. This may be done by turning on the Raman probe laser and analyzing the camera image to locate the center of the laser post position based on the pixelated image 508. In some examples, additionally or alternatively, this may include an image analysis algorithm to locate the bright laser spot, and determine a center to that spot in the pixelated image. If calibration was necessary, these steps would conclude calibration of the system.

Once calibration is complete, or having already been calibrated, the samples may be placed on the stage for analysis 510. Next, the system may capture a pixelated image of the samples, that have been focused by the system and camera on stage 512. Next, the computing system may automatically locate the samples in the X, Y plane using the pixel information (See FIG. 3), or, by manual identification where the system may allow for a human use to select the sample of interested that need to be analyzed by the system 514. In manual identification, the system may allow a human user to select on a display the position on the sample that the user wishes to have analyzed. Next, the system may calculate the required movement of the stage to place the laser spot on the first selected sample position using the pixel-to-distance conversion and the laser spot information 516. Next, the system may move the stage to position for mapped sample under probe to overlap it with the laser spot 518. As explained, instructing the stage to move may include computer instruction to an electric motor such as but not limited to stepper motors, servo motors, AC servo motor, AC induction motor, Piezo motor, Voice coil motor, and/or Actuator or any other kind of electric or other motor capable of moving the stage.

Next, the system may determine if the selected sample is in focus for the camera and probe based on an image captured by the camera 520. Next, if the image is determined by the system to not be in focus, the system may adjust the up and down or Z position of the stage to focus the sample and overlap the sample with the laser focal point for the smallest laser spot 522. Next, once the sample is determined to be in focus, the system may record the Raman probe signal by the spectrometer for the sample 524. After the spectrometer data is captured for the sample, the system may move the stage to the next sample using the mapped coordinates and pixel-to-distance conversion 526. Finally, once the measurements have been captured for the given task, the system may cause display of the result of the sample or all of the samples 528 (See FIG. 4). In some examples, additionally or alternatively, the system may revert back to the first step to determine if a next sample is in focus for the camera and probe, if not, then calibrate 502 to continue with the steps as described.

In such a way, the system may automatically, using captured image data, computer analysis and method steps, process Raman analysis of a single sample, and/or a set of samples on the stage without need for human interaction or input, or use little human interaction or input.

Multiple Raman Probe Examples

In some examples, additionally or alternatively, multiple Raman probes may be used in the setup shown in FIG. 6 where the two Raman probes each utilize different laser wavelengths for analysis but otherwise in a similar setup to FIG. 1.

In some examples, additionally or alternatively, multiple Raman probes and the accompanying lasers and spectrometer may be tuned, configured, or otherwise built for a specific purpose, including complementary purposes with multiple probes. The wavelength of the laser generated and probe and the resolution of the spectrometer that analyzes the data may be of different parameters that may be used for different purposes, for different samples, etc. In such a way, both view range and resolution may be modified, tuned, or determined with multiple probes, for different purposes, such as lower resolution and wider view range area, with another probe with higher resolution and smaller view range area.

For example, Raman spectroscopy with multiple Raman probes using a first setup: 405 nm laser, 400 to 900 nm wavelength range, 1.2 nm resolution and a wide spectral range may be useful for diamond screening. Another second setup may utilize: 532 nm laser, 532 to 670 nm range, 0.22 nm resolution with high resolution, which may be useful for gemstone identification.

Raman features may appear between 200 $cm^{-1}$ to 1500 $cm^{-1}$, which may only cover 41 nm in range but need high resolution spectrometer. Some minerals cannot be identified by a wide range 405 nm Raman/PL system due to lower resolution and fluorescence background.

Spectrometer dependent resolution of 2000 pixels may be used to cover a range of area. An example of diamond screening using 400-900 nm=500 nm range so each pixel is 0.3 nm and these 0.3 nm in the Raman Spectrum, resulting in a 70 scaled, but a lower scale of 10 or 5 may be useful to identify small features, requiring higher resolution. Or in some examples, additionally or alternatively, a specific region of a sample may require analysis using a higher resolution than a wide spectral range. In such examples, the two probe setups may complement one another with lower resolution/higher range and higher resolution/lower range.

Another factor may be that different probes and/or lasers may utilize different wavelengths. Some minerals may be better identified under certain wavelengths. For example, if one wanted to measure Raman spectrum of sapphire, it may be better to use 785 nm to avoid fluorescence and use a higher resolution. Another example may be 405 nm for diamond analysis with low resolution but bigger range.

In some examples, additionally or alternatively, these two Raman probes may focus on slightly different points on the sample and thereby each generate its own chart (See FIG. 4). In some examples, additionally or alternatively, the multiple Raman probes may be time synchronized, such that each may emit its own laser beam and capture spectrometer data at different times to avoid interference. In some examples, additionally or alternatively, no interference may be had and the two probes may each analyze slightly different parts of the same sample at the same time.

In FIG. 6, shows an example hardware setup of the equipment which may be utilized to employ the methods described herein with multiple probes. In the example, many multiple component parts may be included into one overall unit. This unit may include a camera arrangement 615, a first Raman probe 610, a second Raman probe 690, each on their own pivotable mount angled to avoid the line of sight of the camera 615 and/or step motor 611, 691, each with corresponding fiber line 612, 692 to a laser 613, 693 and a fiber line 616, 696 to a spectrometer 617, 697. Also depicted is a gemstone stage 608 along with a cover to shield the laser light from an operator user (not pictured). In some examples, additionally or alternatively, each of these component parts may be mounted to the overall system frame (not shown) by movable and/or adjustable mounting brackets, joints, and/or motors. In such a way, the X, Y, and Z 666 positions for each component part (camera 615, Raman Probes 610, 690, stage 608, etc.) may be moved independently from one another and/or rotated as needed to align, focus, and/or otherwise excite and image capture the samples 606. In some examples, additionally or alternatively, such motors may be in communication with the computing system to create a feedback loop for auto focus of the cameras, and to position each successive sample under the probes for analysis.

The sensors used to measure the gemstones 606 may be the Raman/photoluminescence probes 610, 690 each in communication with a spectrometer 617, 697. The camera 615 may capture image data that may be processed by a computing device also in communication with servo and/or stepper motors 650 in, on, or around the stage 608 to adjust alignment in X, Y, and/or Z positions and/or rotation 652 about one or multiple axes of the sample(s) as described herein.

In some examples, additionally or alternatively, the camera 615 lens 619 may be an Imaging lens for example, but not limited to a Fixed magnification imaging lens, Macro lens (for less distortion), Telecentric lens (for long working distance), Manually or motorized adjustable magnification imaging lens (for changing field of view). The imaging lens 619 may also include manual or motorized focusing such as, but not limited to a digital single-lens reflex camera (DSLR).

Just as in the example of FIG. 1, the focus of the camera arrangements 615 may be used in conjunction with the Raman probes 610, 690 to maintain the working distance of the spectroscopy Raman probes 610, 690. But an advantage to the arrangement of FIG. 6, the multiple Raman probes 610, 690 may each be in communication with different lasers and/or laser generators 613, 693 and/or own spectrometer, 617, 697, such that different analyses may be made of the samples 606 using one setup arrangement. As each Raman probe 610, 690 may be angled out of the way of the camera 615, but still receive an acceptable signal return for analysis by its own spectrometer, 617, 697, this multiple probe arrangement may provide more accurate analysis using multiple wavelengths and thereby multiple tests on samples 606 in quick time succession. Additionally, each Raman probe 610, 690, may be set at their own angle 640, 694 in relation to the samples 606 and camera view 632 such that the individual Raman probes 610, 690 may best analyze the samples 606 based on their laser 613, 693 wavelengths.

Local Mapping Examples

In other examples, the systems and methods here may be used to take one sample on a stone to store, compare, and otherwise analyze. But in some examples, it may be advantageous to utilize the systems and methods here to gather many multiple readings from the spectrometer on one sample stone, to more closely analyze that stone. In such a way, the system may scan and locally map an area of an individual sample stone and use the incremental scanning position data and the spectrometer data to generate a three dimensional graph of the results over that given area. This may be beneficial for samples with multiple characteristics within one stone, and/or for more valuable samples that may deserve more scrutiny than just one reading.

In examples with readings from one area of a stone, charts such as those shown in FIG. 4 may be generated using spectrometer analysis of a stone. But in examples where readings are taken over multiple X, Y horizontal points of one stone, such as those covering a two-dimensional surface, the systems and methods here may generate a three dimensional chart. Such a three dimensional chart may depict spectrometer data covering a given two-dimensional area such as a table of a gemstone.

Figure 7:
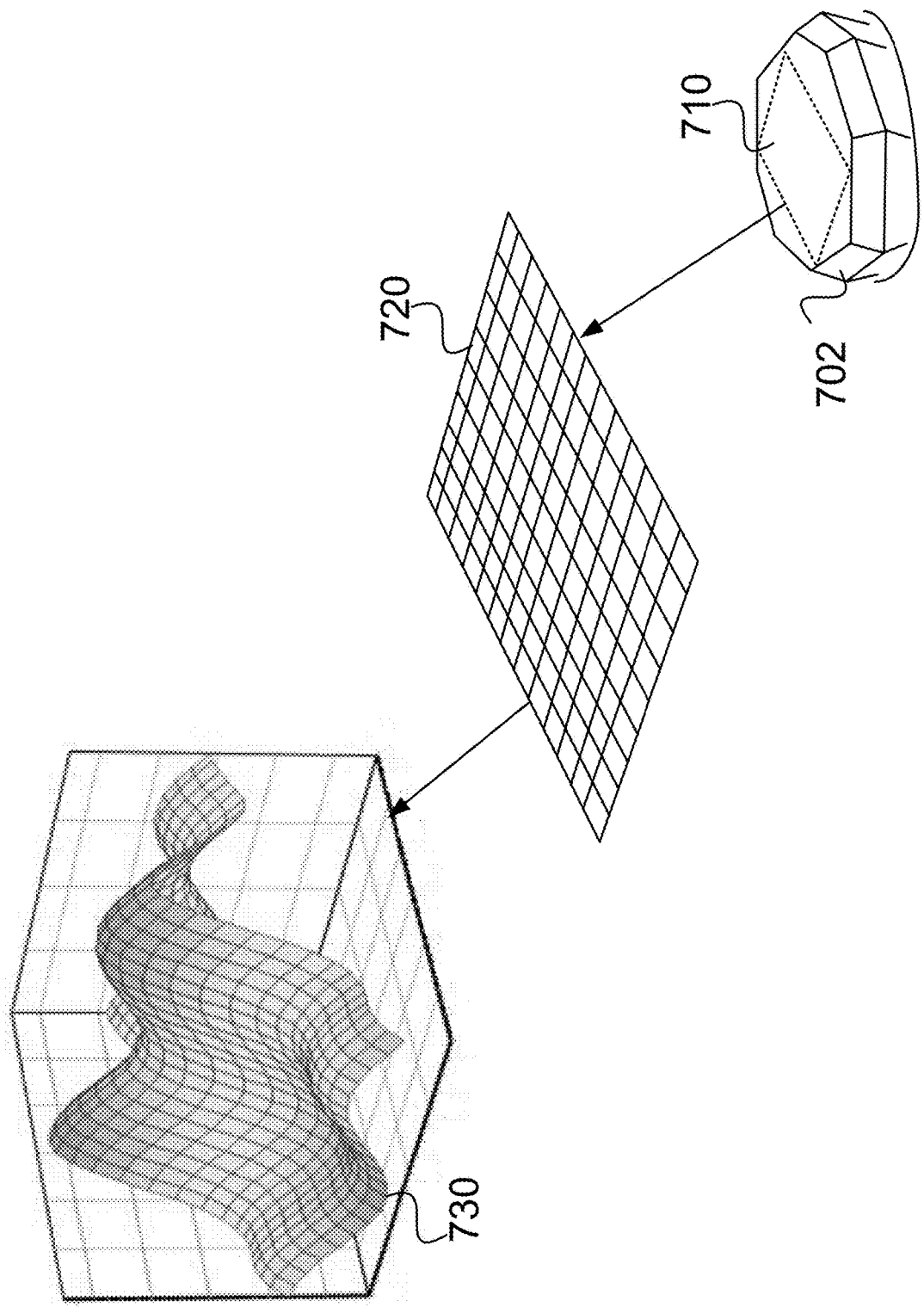
FIG. 7 is an example three dimensional chart extrapolation in accordance with certain aspects described herein.

FIG. 7 shows just such an example, where a sample stone 702 has a given area on its table 710 where the system may scan over the surface to obtain results. For example, the area on the sample stone may be 5 m×5 mm square and the system may be programmed to scan that area in a pattern, taking readings every pre-determined increment, such as but not limited to every 100 µm in a scan pattern such as a grid, rows, columns, or other patterns. By scanning the two dimensional area, the system may create a three dimensional chart covering the two-dimensional area 720 such as the 5 m×5 mm area of the stone 702 of FIG. 7. In such examples, one spectrometer measurement is taken and recorded every predetermined distance, such as but not limited to every 100 µm across the predetermined pattern 720. The system may keep track of the position within the two dimensional area where each reading is taken, and the reading results, and the data may be consolidated to create a chart with three dimensions, X, Y, and wavelength as a 3-D model data set or results 730. In such a way, the probe may be swept or scanned in a pattern 720 over an entire predetermined two dimensional area 710 to create this three dimensional chart 730 which may be analyzed, compared, and used to determine information about the sample 702 at a more granular level than sampling just one spot on the stone 702.

In some examples, additionally or alternatively, artificial intelligence or machine learning may be used to help local mapping. In such examples, many multiple examples of incremental stage movement and/or image focusing may be fed to the system, to train the algorithms so that the algorithms used to determine if a sample is focused or not, and may learn from the examples and over time make corrections to obtain better local mapping results.

Network Examples

Systems and methods here may utilize a networked computing arrangement as shown in FIG. 8. In FIG. 8, a computer 802 may be used to process the data from the spectrometer (142 in FIG. 1), the pixel data of the captured images of the camera, send and receive instructions to the stage motors, or send and receive other data such as sample location, identification information of the stones, time and date, etc. The computer 802 used for these steps could be any number of kinds of computers such as those included in the spectrometer and/or camera itself, and/or another computer arrangement in communication with the spectrometer and/or camera computer components including but not limited to a laptop, desktop, tablet, phablet, smartphone, or any other kind of device used to process and transmit digitized data. More examples are described in FIG. 9.

Turning back to FIG. 8, the data captured for the pixelated image, stone sample identifying information, location, and/or spectrometer data from whichever computer 802 may be analyzed on a back end system instead of or in addition to a local computer. In such examples, data may be transmitted to a back end computer 830 and associated data storage 832 for saving, analysis, computation, comparison, or other manipulation. In some examples, additionally or alternatively, the transmission of data may be wireless 810 by a cellular or Wi-Fi transmission with associated routers and hubs. In some examples, additionally or alternatively, the transmission may be through a wired connection 812. In some examples, additionally or alternatively, the transmission may be through a network such as the internet 820 to the back end server computer 830 and associated data storage 832. At the back end server computer 830 and associated data storage 832, the pixelated image data, sample identification, sample location, time, date, and/or spectrometer data may be stored, analyzed, compared to previously stored spectrometer data for matching, identification, and/or any other kind of data analysis. In some examples, additionally or alternatively, the storing, analyzing, and/or processing of data may be accomplished at the computer 802 which is involved in the original image capture and/or spectrometer collection. In some examples, additionally or alternatively, the data storing, analyzing, and/or processing may be shared between the local computer 802 and a back end computing system 830. In such examples, networked computer resources 830 may allow for more data processing power to be utilized than may be otherwise available at the local computers 802. In such a way, the processing and/or storage of data may be offloaded to the compute resources that are available. In some examples, additionally or alternatively, the networked computer resources 830 may be virtual machines in a cloud or distributed infrastructure. In some examples, additionally or alternatively, the networked computer resources 830 may be spread across many multiple physical or virtual computer resources by a cloud infrastructure. The example of a single computer server 830 is not intended to be limiting and is only one example of a compute resource that may be utilized by the systems and methods described herein. In some examples, additionally or alternatively, artificial intelligence and/or machine learning may be used to analyze the spectrometer data from the samples and/or focus the imaging camera for use with stage movement. Such systems may employ data sets to train algorithms to help produce better and better results of analysis of samples, identification of focused samples, stage movement, etc.

Example Computer Devices

FIG. 9 shows an example computing device 900 which may be used in the systems and methods described herein. In the example computer 900 a CPU or processor 910 is in communication by a bus or other communication 912 with a user interface 914. The user interface includes an example input device 916 such as a keyboard, mouse, touchscreen, button, joystick, or other user input device(s). The user interface 914 also includes a display device 918 such as a screen. The computing device 900 shown in FIG. 9 also includes a network interface 920 which is in communication with the CPU 910 and other components. The network interface 920 may allow the computing device 900 to communicate with other computers, databases, networks, user devices, or any other computing capable devices. In some examples, additionally or alternatively, the method of communication may be through WIFI, cellular, Bluetooth Low Energy, wired communication, or any other kind of communication. In some examples, additionally or alternatively, the example computing device 900 includes peripherals 924 also in communication with the processor 910. In some examples, additionally or alternatively, peripherals include stage motors 926 such as electric servo and/or stepper motors used for moving the stage for the sample analysis. In some examples peripherals 924 may include camera equipment 928, and/or spectrometer 929. In some example computing device 900 a memory 922 is in communication with the processor 910. In some examples, additionally or alternatively, this memory 922 may include instructions to execute software such as an operating system 932, network communications module 934, other instructions 936, applications 938, applications to digitize images 940, applications to process image pixels 942, data storage 958, data such as data tables 960, transaction logs 962, sample data 964, sample location data 970 or any other kind of data.

Conclusion

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method of capturing and analyzing spectrometer data on multiple sample gemstones, the method comprising:
    by a computer with a processor and memory, in communication with a digital camera, a Raman probe, and at least one stage motor configured to move a stage,
    determining if a first sample gemstone on the stage is in focus for the digital camera and the Raman probe, by analyzing a captured digital image of the first sample taken by the digital camera,
        if the first sample is not in focus, by the computer, focusing the camera on the first sample by sending instruction to the motor to move a Z stage;
    if the first sample is in focus, capturing a pixelated image of the stage including first sample and multiple samples using the digital camera,
    determining, by the computer, relationships among the multiple samples on the stage using the pixelated image;
    directing movement of the stage, by the stage motors, to position the first sample under the Raman probe; and
    recording a spectrometer signal of the Raman probe for the first sample.

2. The method of claim 1 wherein the at least one stage motor is capable of moving the stage in an X, Y and Z direction.

3. The method of claim 1 wherein the at least one stage motor is capable of rotating the stage.

4. The method of claim 1 wherein the Raman probe is mounted in an angled configuration as measured from a line of sight between the camera and the stage.

5. The method of claim 1, further comprising,
    determining a hue, lightness, and chroma value for the first sample using the pixelated image of the first sample;
    determining a color grade from D to Z of the first sample, based on the corresponding hue, lightness, and chroma determined values.

6. The method of claim 1 wherein directing movement of the stage includes determining relationships, by the computer, between a laser spot position of a Raman probe, and increments the stage motors may move.

7. The method of claim 2 further comprising, directing movement of the stage, to position a second sample under the Raman probe; and
    recording a second signal analysis of a second Raman probe for the second sample, wherein the second Raman probe is mounted in an angled configuration as measured from a line of sight between the camera and the stage, wherein the Raman probe and the second Raman probe are each configured with spectrometers of different resolution.

8. The method of claim 7 wherein, after the second sample is under the Raman probe, determining if the second sample gemstone on the stage is in focus for the digital camera and the Raman probe, by analyzing a captured image of the sample taken by the digital camera; and
- if the second sample is in focus, recording a signal analysis of the Raman probe for the second sample.

9. The method of claim 1 further comprising, by a back end computer with a processor and a memory, comparing the received signal analysis of the Raman probe of the first sample gemstone to known data of gemstones, and determining a match of the received signal analysis of the Raman probe with the known data of gemstones.

10. The method of claim 1 further comprising,
- determining a size of the first sample by comparing pixel numbers in the first sample of the pixelated image to a calibration of distance;
- determining a mineral type of the first sample based on the Raman spectra of the first sample;
- determining a density of the first sample using the mineral type using a table of density and mineral types;
- determining a volume of the first sample using the determined size of the first sample; and
- determining a weight of the first sample by multiplying the determined density by the determined volume.

11. A system for recording spectrometer readings of multiple gemstone samples, the system comprising,
- a computer with a processor and a memory, in communication with a digital camera, at least one motor configured to move a stage, a Raman probe and a spectrometer,
- wherein the stage is configured to receive multiple gemstones for analysis by the spectrometer,
- wherein the digital camera is mounted with a field-of-view covering at least a portion of the stage where the multiple gemstones may be received, and
- wherein the stage motor is configured to move the stage in response to instructions from the computer having analyzed pixelated digital images from the digital camera to identify positions of the multiple gemstones on the stage, such that the Raman probe is positioned on each of the multiple gemstones on the stage, for analysis.

12. The system of claim 11 wherein the Raman probe is mounted at an angle as measured from a line of sight between the camera and the stage and aimed at least a portion of the stage.

13. The system of claim 11 wherein the Raman probe includes a laser.

14. The system of claim 11 wherein the at least one motor configured to move a stage includes an X, Y, and Z stage motor.

15. The system of claim 11 wherein the at least one motor configured to move a stage includes a rotating stage motor.

16. A method of analyzing a gemstone, the method comprising:
- by a computer in communication with a Raman probe, a spectrometer, and at least one stage motor configured to move a stage supporting a gemstone,
- causing the Raman probe to send data regarding the gemstone on the stage to the spectrometer, at a first location on a table of the gemstone;
- storing, by the computer, resulting spectrometer signal of the Raman probe of the first location on the table of the gemstone;
- causing by the computer, the at least one stage motor to move the stage in at least one of an X and Y direction and thereby reposition the Raman probe to a second location on the table of the gemstone;
- causing by the computer, the Raman probe to send data regarding the gemstone on the stage to the spectrometer, at the second location on a table of the gemstone;
- storing by the computer, resulting spectrometer signal of the Raman probe of the second location on the table of the gemstone;
- generating by the computer, a three-dimensional chart depicting spectrometer data covering the table of a gemstone, using at least the stored resulting spectrometer signals of the Raman probe of the first and second location of the table of the gemstone.

17. The method of claim 16, wherein a distance between the first location and second location on the gemstone table is 100 μm.

18. The method of claim 16 wherein the computer is further configured to repeat the spectrometer data collection over a predetermined area on the gemstone table.

19. The method of claim 18 wherein the repeated spectrometer data collection over the predetermined area on the gemstone table is in a grid pattern and wherein the predetermined area is 5 mm by 5 mm square.

20. The method of claim 16 wherein the generated three-dimensional chart includes dimensions, X, Y, and wavelength as a 3-D model data set.

* * * * *